United States Patent [19]
Goodwin et al.

[11] Patent Number: 5,388,247
[45] Date of Patent: Feb. 7, 1995

[54] HISTORY BUFFER CONTROL TO REDUCE UNNECESSARY ALLOCATIONS IN A MEMORY STREAM BUFFER

[75] Inventors: Paul M. Goodwin, Littleton; Kurt M. Thaller, Acton; Barry A. Maskas, Sterling, all of Mass.

[73] Assignee: Digital Equipment Corporation, Maynard, Mass.

[21] Appl. No.: 197,376

[22] Filed: Feb. 16, 1994

Related U.S. Application Data

[63] Continuation-in-part of Ser. No. 37,247, May 14, 1993, abandoned.

[51] Int. Cl.$^6$ .............................................. G06F 11/34
[52] U.S. Cl. ................................... 395/425; 364/948; 364/957.9; 395/250
[58] Field of Search ................ 395/425, 400; 364/948, 364/957.9, 263.1

[56] References Cited

U.S. PATENT DOCUMENTS

| | | | |
|---|---|---|---|
| 3,840,863 | 10/1974 | Fuqua et al. | 395/600 |
| 4,159,532 | 6/1979 | Getson, Jr. et al. | 395/275 |
| 4,499,576 | 2/1985 | Fraser | 370/60 |
| 4,853,840 | 8/1989 | Shibuya | 395/375 |
| 4,980,823 | 12/1990 | Liu | 395/425 |
| 4,989,135 | 1/1991 | Miki | 395/325 |
| 5,168,557 | 12/1992 | Shibuya | 395/375 |
| 5,251,310 | 10/1993 | Smelser et al. | 395/425 |
| 5,261,066 | 11/1993 | Jouppi et al. | 395/425 |
| 5,265,236 | 11/1993 | Mehring et al. | 395/425 |

Primary Examiner—Jack B. Harvey
Assistant Examiner—Michael H. Tall
Attorney, Agent, or Firm—James F. Thompson; Ronald C. Hudgens; Albert P. Cefalo

[57] ABSTRACT

A read buffering system employs a bank of FIFOs to hold sequential read data for a number of data streams being fetched by a computer. The FIFOs are located in the memory controller, so the system bus is not used in memory accesses used to fill the stream buffer. The system stores addresses used for read requests made by a CPU, and if a next sequential address is then detected in a subsequent read request, this is designated to be a stream (i.e., sequential reads). When a stream is thus detected, data is fetched from DRAM memory for addresses following the sequential address, and this prefetched data is stored in one of the FIFOs. The system also prevents the unnecessary prefetching of data by preventing certain CPU requests from being used to detect streams. A FIFO is selected using a least-recently-used algorithm. When the CPU subsequently makes a read request for data in a FIFO, this data can be returned without making a memory access. By taking advantage of page mode, access to the DRAM memory for the prefetch operations can be transparent to the CPU, resulting in substantial performance improvement if sequential accesses are frequent. The data is stored in the DRAMs with ECC check bits, and error detection and correction (EDC) is performed on the read data downstream of the stream buffer, so the stream buffer is protected by EDC.

3 Claims, 14 Drawing Sheets

Fig. 13
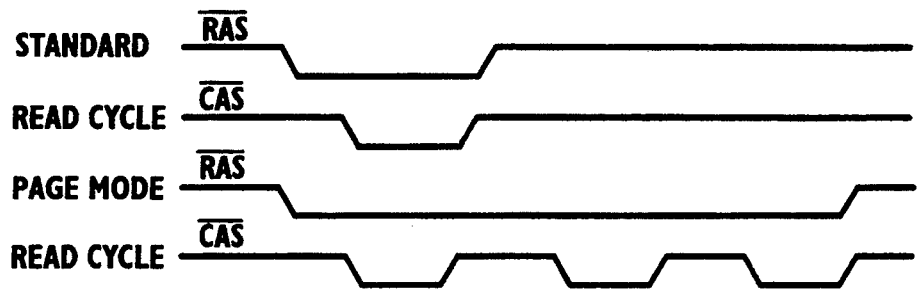
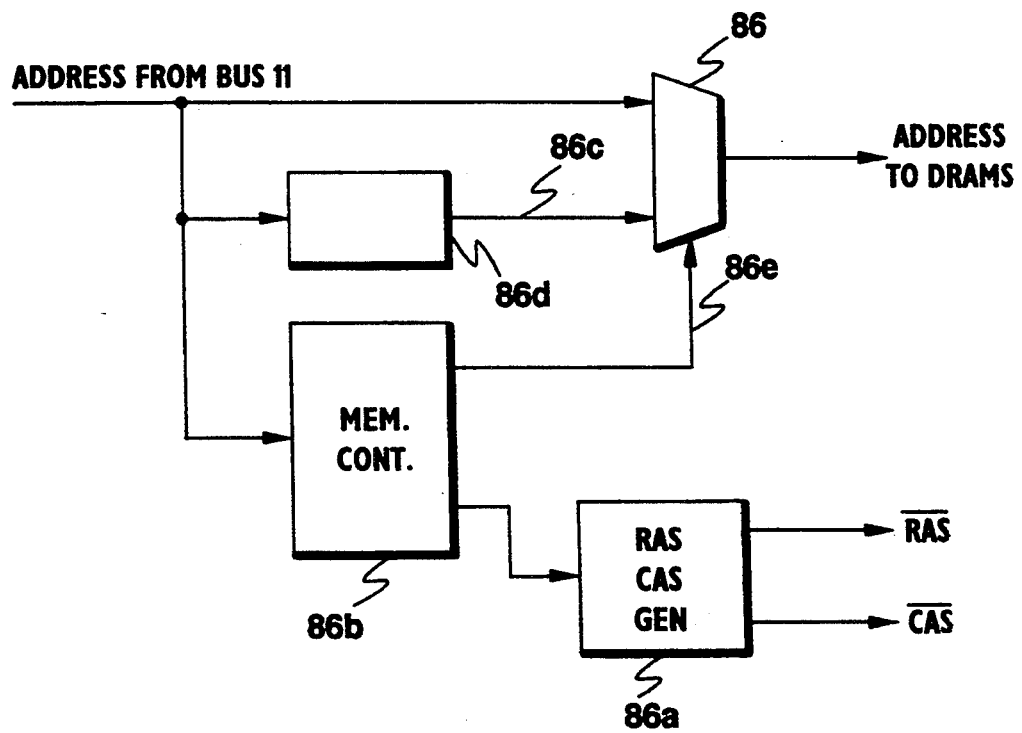
Fig. 14

HISTORY BUFFER CONTROL TO REDUCE UNNECESSARY ALLOCATIONS IN A MEMORY STREAM BUFFER

This application is a continuation-in-part, of application Ser. No. 08/037,247, filed on May 14, 1993, now abandoned.

RELATED CASES

The present application relates to the following pending applications assigned to the assignee of this application:

Ser. No. 874,080, filed Apr. 24, 1992, by Donald W. Smelser, David A. Tatosian, and Paul M. Goodwin, for "Memory Stream Buffer";

Ser. No. 874,077, Filed Apr. 24, 1992, by Paul M. Goodwin, Donald W. Smelser, and David A. Tatosian, for "Stream Buffer Memory Fill Optimization";

Ser. No. 874,076, filed Apr. 24, 1992, by David A. Tatosian, Paul M. Goodwin, and Donald W. Smelser, for "Memory Stream Buffer with Appended Fill Operation";

Ser. No. 874,075, filed Apr. 24, 1992, by David A. Tatosian, Donald W. Smelser, and Paul M. Goodwin, for "Stream Buffer with Error Correction and Detection" now abandoned;

Ser. No. 874,074, filed Apr. 24, 1992, by Donald W. Smelser, Paul M. Goodwin, and David A. Tatosian, for "Stream Buffer with Allocation and Invalidate Functions";

Ser. No. 874,071, filed Apr. 24, 1992, by David A. Tatosian, Donald W. Smelser, and Paul M. Goodwin, for "Stream Buffer with Direct Read/Write Mode";

Ser. No. 873,927, filed Apr. 24, 1992, by Nitin Godiwala, Kurt Thaller, and Barry Maskas, for "Modified Exchange Protocol"; and Ser. No. 546,572, filed Jun. 29, 1990, by Nicholas Warchol, Donald Smelser, and Gary Lidington for "Exchange Transaction" now U.S. Pat. No. 5,251,310.

BACKGROUND OF THE INVENTION

This invention relates to memory systems for computers, and more particularly to a method for enhancing performance of a memory stream buffer.

Referring to FIG. 1, a typical memory system contains three main parts:
—a bus 11 which allows one or more CPUs 16 to read and write data from a memory 12;
—dynamic random access memory devices ("DRAMs") which are the main memory storage elements 12; and
—a memory controller 14 which allows the bus 11 to communicate with the DRAMs.

Instructions from a CPU 16 travel along the bus to the memory controller 14. The memory controller 14 in turn supplies the DRAMs with address data so that the desired information can be retrieved or stored.

The information transferred between the CPU and DRAMs must conform with certain timing relationships between the request signal and the information on the bus. Retrieving or storing data in the DRAMs, however, can take a number of "cycles". A cycle is the time interval between the instant at which the DRAMs receive a request from the CPU and the instant the information is available for use by the CPU. The number of cycles required can affect the system timing and thus system performance.

One objective of computer design is to provide the CPU with information at the fastest possible rate. To increase processing speed, many computer systems now employ what is called a "cache" memory. A cache is a high speed memory which holds a subset of data from the main memory that is used to decrease the need to access the DRAMs for each CPU command. When the CPU issues a command the cache is checked first to see if it contains the requested information. If the cache contains the requested data (a "hit"), then that data is sent to the CPU. If that data is not in the cache (a "miss"), then that data must be retrieved from the DRAMs.

As the speed of processors increases, the latency time for access to the DRAMS has become a major problem. For example, a high speed reduced instruction set computer (RISC) of the type disclosed in pending application Ser. No. 547,630, filed Jun. 29, 1990, assigned to Digital Equipment Corporation, may be constructed to operate at a CPU cycle time of 5 nano seconds or less, and execute an instruction during each cycle. If the main memory (usually composed of DRAMs) has a cycle time of 300 nano seconds, for example, it can be calculated that the CPU could spend much of its time waiting for memory even when the system uses a cache. In efforts to bring the memory performance on par with the CPU, the cache memory can be made hierarchial, providing primary, secondary, and in some cases third level caches, and the speed of the cache memory can be increased as much as is economical. In addition, the bandwidth of the memory bus can be increased by using a wider data path. Nonetheless, there is still a need to reduce the amount of time the CPU spends waiting on memory, to achieve acceptable performance of these high speed CPUs.

The cache memory operates in accordance with the "principle of locality"; that is, if a memory location is addressed by the CPU, it and nearby memory locations will probably be addressed again soon. The principle of locality suggests that cache lines will often be accessed in sequence. When two sequential cache lines are accessed there is a reasonable probability that sequential accesses will continue. The frequency of sequential read operations lends itself to creation of a buffering system to detect such sequences and use them to prefetch additional data.

"Stream buffers" can be used to access data more quickly in the case of sequential read requests. A stream buffer holds read data prefetched from addresses following a sequential read access from the CPU. Placing stream buffers in the memory controller provides a faster access to sequential data located on memory modules installed on a multi-node memory interconnect or "bus." By taking advantage of the "fast page mode" capabilities of the DRAMs sequential memory accesses are detected. In response to these sequential address requests, memory data from the next sequential location is prefetched in advance of the actual request for that data by the hosting computer. That data is placed in a high speed memory device. As a result, when the host computing system requests data from the next sequential location, the data can be delivered to the host computing system much faster than if the data had to be delivered directly from the DRAMs on the memory modules, thus increasing the processing speed.

The stream buffers are located on the memory module itself, rather than in the CPU. The stream buffer memory can be placed on the memory modules so the buffers can be filled without using the system bus (which is shared with other resources), thereby conserving system memory interconnect bandwidth and throughput. Also a significant performance advantage can be realized by filling the stream buffers using the fast page :mode operation of the DRAM devices. By placing the stream buffer memory within the logic domain covered by the memory module error detection and correction logic, the reliability, availability, and data integrity is enhanced.

However, stream buffers sometimes are allocated unnecessarily to transactions which do not benefit from the reduced read latency of stream buffering. Frequently a sequential address stream is detected causing a buffer to be allocated and filled with prefetch data that is never used. This unnecessary allocation of stream buffers reduces the memory's availability to other bus transactions. Therefore, the stream detection logic can contain buffer enable and invalidation circuits which prevent the unnecessary allocation of stream buffers and thus reduce latency on read streams and increase system performance.

SUMMARY OF THE INVENTION

In accordance with one embodiment of the invention, each bus transaction requesting data from memory is polled to determine whether the data in question is eligible for storage in a history buffer. For each eligible address, a history buffer is activated to store the transactions' memory address. The address is then incremented and stored in a history buffer register. Each history buffer register is updated in turn with the incremented address of subsequent transactions requesting data from memory. Additionally, for each write transaction occurring on the bus, the incremented address of that transaction is compared to the contents of the history buffer registers. If a match is found between the write transaction address and an address in the history buffer, the address in the history buffer is declared invalid, thus preventing the address' use in detection of streams and allocation of stream buffers.

The stream buffer system stores addresses used for read requests made by a CPU, and if a next sequential address is then detected in a subsequent read request, a stream is declared (i.e. sequential reads). When a stream is thus detected, data is fetched from DRAM memory for addresses following the sequential address, and this prefetched data is stored in one of the first-in, first-out (FIFO) buffers used to construct the stream buffer system. A FIFO is selected to store the prefetched data using a least-recently-used algorithm. When the CPU subsequently makes a read request for data in a FIFO, this data can be returned without making a memory access, thus decreasing the access time seen by the CPU. By taking advantage of page mode capabilities of the DRAM, access to the DRAM memory for the prefetch operations can be transparent to the CPU, resulting in substantial performance improvement if sequential accesses are frequent.

BRIEF DESCRIPTION OF THE DRAWINGS

The novel features believed characteristic of the invention are set forth in the appended claims. The invention itself, however, as well as other features and advantages thereof, will be best understood by reference to the detailed description of the specific embodiment, when read in conjunction with the accompanying drawings, wherein:

FIG. 13 is a timing diagram of events vs. time for a DRAM implementing a page mode operation;

FIG. 14 is a diagram in block form of the memory control for generating appended fill cycles, used in the module of FIG. 3, according to one embodiment.

DETAILED DESCRIPTION OF SPECIFIC EMBODIMENTS

Figure 1:
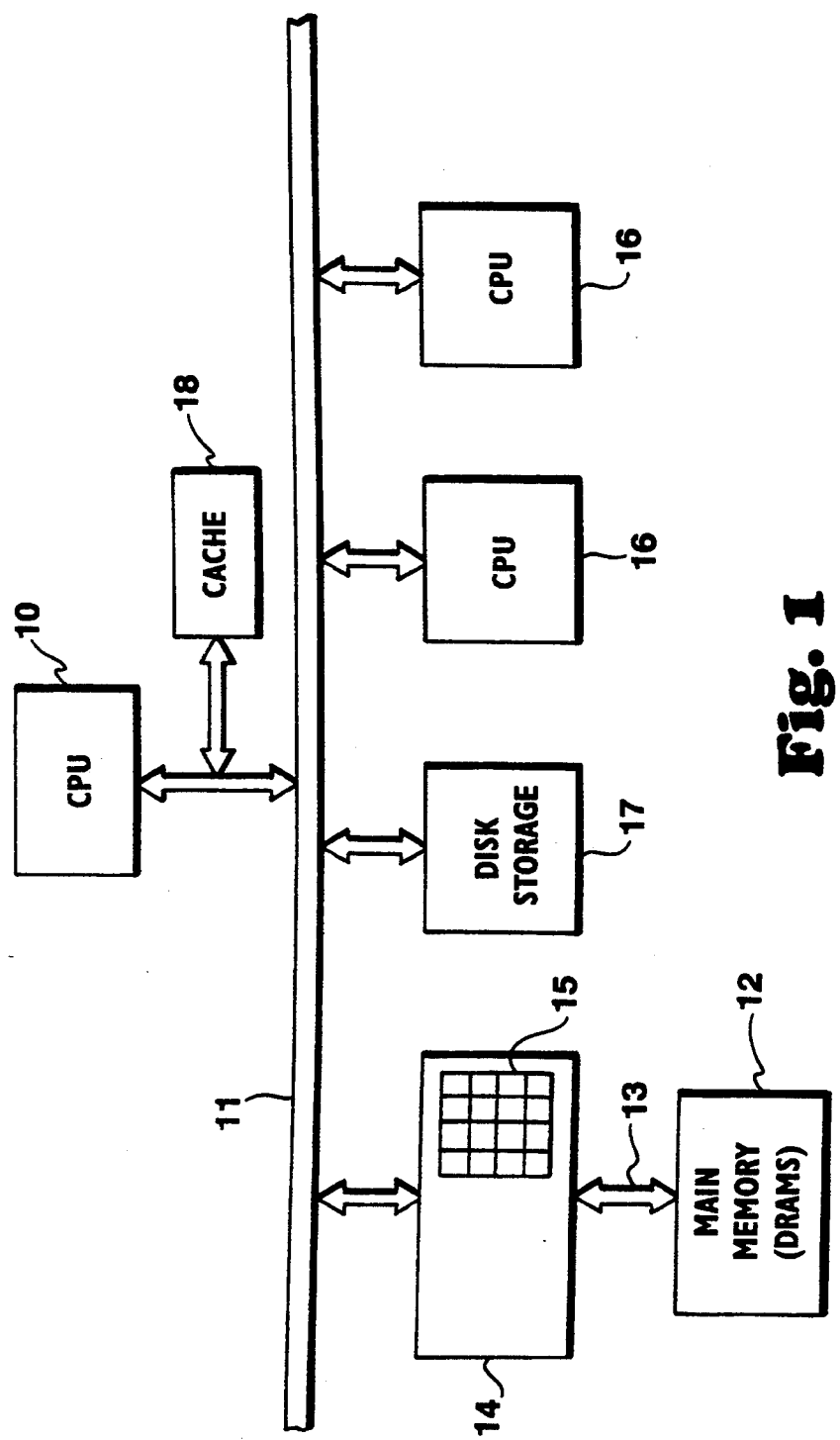
FIG. 1 is a diagram of an illustrative computer system which may employ features of one embodiment of the invention.

Referring to FIG. 1, a computer system is illustrated which uses stream buffers having features of this invention. A "bus commander" (i.e., a component or subsystem which initiates bus transactions) such as CPU 10 is connected to a system bus 11 for access to various system resources. The CPU may be, for example, of the VAX trademark architecture as described by Levy and Eckhouse in, "Computer Programming and Architecture: the VAX", 2nd ed., Digital Press, 1989. A single chip CPU of the VAX architecture is disclosed in U.S. Pat. No. 5,006,980 issued to Sander, Uhler and Brown, assigned to Digital Equipment Corporation, the assignee of this invention. The CPU 10 also may be of an advanced 64 bit RISC architecture as disclosed in pending application Ser. No. 547,630 filed Jun. 29, 1990, also assigned to Digital Equipment Corporation. Alternately, the CPU may be of many other types, such as the Intel 386 or 486 architecture, or MIPS R3000 or R4000 RISC architecture. The system bus 11 may be any of the standard bus specifications used for any of the many commonly used CPU's, but in this example embodiment bus 11 is a VAX bus.

A main memory 12 is connected to the system bus 11 by a memory bus 13 and a memory interface or control 14 containing a stream buffer 15. The purpose of the stream buffer 15 is to hold read data prefetched from addresses following a sequential read access received from the CPU 10.

When a read request from a given address X is received by the control 14 from the CPU 10 on the system bus 11, this address X is stored to see if the CPU 10 will soon thereafter issue a read request from the next sequential location (cache line) X+1. If so, the response of the memory interface 14 is to fetch the data at address X+1 from the memory 12 and send it back to the CPU 10 on the system bus 11, then to fetch sequential data at addresses X+2, X+3, etc. and store this data in the stream buffer 15. The bus cycle for the system bus 11 and the operation of CPU 10 are such that the time between read request from the CPU for sequential data is sufficient to allow for memory cycles on the memory bus 13 to be executed to fill the stream buffer 15 with the desired data stream before the CPU makes the memory request. The stream buffer 15 is large enough to hold a number of data streams, e.g., four streams. Thus, more than one task may be executed on the CPU 10, and several streams may be working simultaneously. The stream buffer 15 is constructed as a set of four FIFOs, with four entries for each FIFO.

In addition to the CPU 10, other CPUs 16, as seen in FIG. 1, may be accessing the memory 12 by the system bus 11 in a multi-processor system, so streams may be resident in stream buffer 15 for more than one processor as well as more than one process. Other types of bus commanders such as, a disk storage facility 17 or various I/O modules which interface printers and terminals, may likewise be used in conjunction with the stream buffering system.

Memory references made by the CPU 10 to the memory 12 are for a cache line. A cache 18 holds a subset of data from memory 12, and is accessed in a much shorter cycle than an access to memory 12. A large percentage of the memory requests made by the CPU 10 result in cache hits (approximately 90%), and so require no transaction on the bus 11. When a cache miss occurs, however, the data from the requested location in memory 12 is fetched via the bus 11, and the entire cache line containing this memory location is fetched from memory and used to fill a line of cache 18.

Memory references are therefore on integer cache line boundaries. Thus "incrementing by+1" should be understood to mean that addresses are incremented by +16 byte addresses or +32 byte addresses, or whatever the configuration requires. The address sent out on the bus 11 from the CPU is truncated because some low-order bits of the address are never needed in addressing the memory 12. The cache 18 may be internal to a microprocessor chip which implements the CPU 10 or external; more often, a combination of on-chip (first-level) and external (secondary or back-up) cache is used. In a particular embodiment, the cache 18 is direct-mapped, meaning that only one cache location is available for a given index number, i.e., all memory references having the same index will map to the same location in the cache. This is pertinent to the address transposing mentioned below in reference to exchange transactions.

Figure 2:
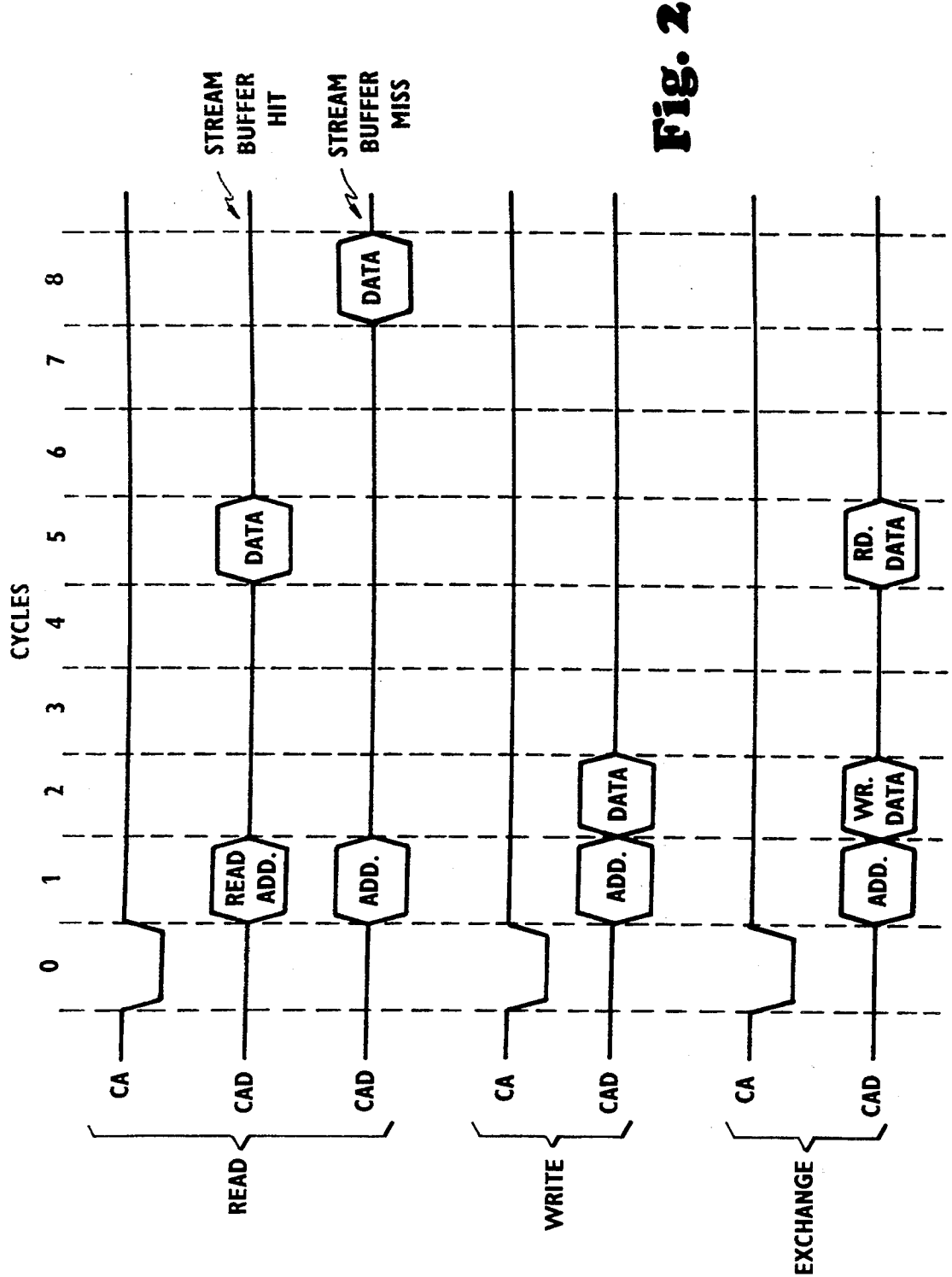
FIG. 2 is a timing diagram showing events v. time for bus cycles in the system of FIG. 1.

As illustrated in FIG. 2, the bus 11 can be a multiplexed command/ address/data bus on which memory requests are sent by the CPU 10 in the manner illustrated in FIG. 2. A memory request is initiated in cycle-0 by a command strobe CA, an output from the CPU. In cycle-1, the bus 11 is driven by commands and address bits labeled CAD (Command/Address/Data) in FIG. 2, in the first example representing a read request. If the requested data is in the stream buffer 15, the data is returned to the bus 11 in cycle-5, but if the requested data is not in the stream buffer, the data is returned to bus 11 in cycle-8. The difference of read cycles represents the delay in accessing the memory 12, compared to getting the data directly from the stream buffer 15. When read data is retrieved from memory 12, the bus 11 is placed in a "stall" or wait state so that the data can be retrieved from its memory location and placed on the bus. This stall is generally accomplished by creating a delay during a particular bus cycle and repeating that cycle until the data is retrieved and ready to go on the bus. For example, in FIG. 2, the delay created in cycles 5–7 in the case of a stream buffer miss actually is cycle 4 repeated three times.

A write cycle as illustrated in FIG. 2 is initiated by a CA strobe as before, and the write address and write command are asserted on bus 11 by the CPU in cycle-1, followed immediately by the write data in cycle-2. The delay before another memory transaction can begin on the bus 11 following a write depends on whether the write can be made to a write buffer (not shown) or must be sent to memory 12.

The memory 12, in one embodiment, supports an "exchange" transaction which consists of both a write and a read in one bus transaction. An exchange is ordinarily used to write back a cache line from the cache 18 to memory 12 and to read a cache line from memory 12 to the same location in cache 18; this can be done, of course, only if the addresses are appropriate, since only one cycle of address information is sent. This operation is used to enhance performance of the memory system when filling a cache location in the instance of a cache miss to a "dirty" cache line (one that has been written to).

Instead of writing back the dirty data and reading in the new data in two separate transactions, the exchange transaction takes advantage of the read latency time of the DRAMs and transfers the dirty cache line from cache 18 to the main memory 12 during the latency time needed to read data from main memory 12. The exchange is completed by reading back the new cache line from main memory 12 to cache 18. An exchange transaction uses the address fields sent in cycle-1 to send the unique cache tag address for the memory location in main memory 12 where the dirty cache line is to be stored, and also the cache tag address for the cache line to be loaded into the cache 18. In addition, a single cache index field is sent for an exchange transaction. Thus, two cache tag addresses (16-bits each) and one index (13-bits) are sent on bus 11 in cycle-2.

The CPU can be structured such that it has two levels of cache: cache within the CPU 10 and a cache 18 such as shown in FIG. 1. If the data is in the cache 18 it is readily available to the bus, and therefore, the dirty cache line can be assessed and readied for transfer to the main memory without stalling the bus. This is a general exchange transaction. However, if the dirty cache line is in the CPU's internal cache, it takes a few bus cycles to get the data out of the CPU's internal cache and placed on the bus 11. This is a cycle-2 stall exchange transaction.

FIG. 2 illustrates a general exchange command which begins in cycle-0 with a CA strobe, the address and command is asserted by the CPU 10 on the bus 11 in cycle-1, and the write data is asserted on the bus 11 by the CPU in cycle-2. If the write can be done to a write buffer, and the read data is in the stream buffer 15, it is returned on bus 11 in cycle-5, or if an access to memory 12 for the read is needed then read data is returned in cycle-8 (not shown).

Figure 3:
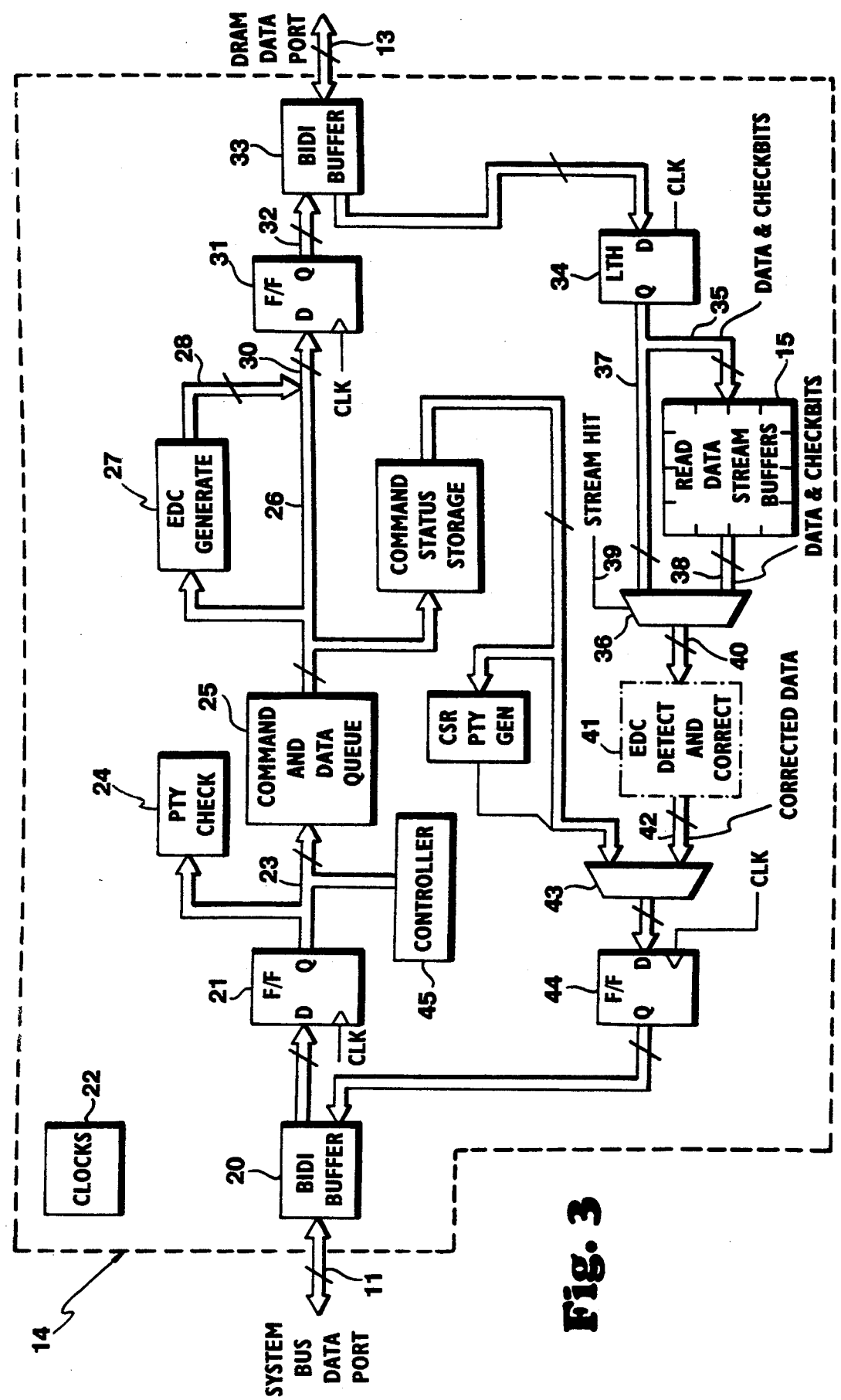
FIG. 3 is a diagram in block form of a memory control used in the system of FIG. 1 and employing features of the invention.

Referring to FIG. 3, the control module 14 is shown in more detail. The control module handles write data as well as read data. Write data is depicted as moving from left to right at the upper part of FIG. 3, from system bus 11 to memory bus 13, and read data moves from right to left at the lower part of FIG. 3, from memory bus 13 to system bus 11. The stream buffer 15 is in the read data path. A bidirectional bus interface 20 accepts data and commands (read and write requests, including addresses, as in FIG. 2) from the system bus 11, and applies the received information to a latch 21 clocked by a local clock source 22. The output from the latch 21 is applied by lines 23 to a parity check circuit 24; if parity does not check then a fault is signalled. The information on lines 23 is also applied to a command and data queue 25. A read request is held for execution, with just the address and commands being sent to the memory 12 (if access to memory 12 is needed) under control of the controller, but a write request has data to be sent on to memory 12. Output from the command and data queue on lines 26 for a write request is applied to an error detection and correction (EDC) generator circuit 27 where EDC bits are calculated and output on lines 28. The EDC bits on output 28 are added to the data on lines 26, producing a full data word including EDC bits on lines 30. If the data width at the output lines 26 is 128-bits, for example, then the EDC circuit 27 may generate a 12-bit EDC field on lines 28, so the total width of the output on lines 30 is 140-bits. The latch 31 provides an output 32 to a bidirectional bus interface 33 which interfaces with the memory bus 13.

When a read request requiring an access to memory 12 is being executed, the read data path receives data from the memory bus 13 via bidirectional interface 33 and clocked latch 34. The read data can be applied to the stream buffer 15 by lines 35, or can be applied directly to a multiplexer 36 by lines 37 to bypass the stream buffer. In executing a read request where the data requested is not in the buffer 15. The read data returned to the unit 14 from the memory 12 is sent directly the CPU by the path 37 rather than being stored in the buffer 15. If requested data is in the buffer 15, however, it is applied to the multiplexer 36 by lines 38, without needing a memory access to DRAMs 12. Selection of which input lines 37 or 38 are used as the output of the multiplexer 36 is made by a stream hit input 39. The output 40 of the multiplexer 36 is applied to an error detection and correction (EDC) circuit 41. The circuit 41 accepts the 140-bit wide data input on lines 40 and uses the 12-bit EDC field to determine if the 128-bit data field is correct, and toggles incorrect bits if found. If more than two bits are incorrect, a fault is signaled and the data is not corrected. The output 42 of the EDC circuit 41 is 128-bits wide and is applied to a multiplexer 43 for coupling back through a clocked latch 44 to the bus interface; 20, from which read data is sent back to the CPU 10 via system bus 11. A controller 45 receives commands loaded to the memory control 14 from the CPU 10 via bus 11. and generates the hit signals and various control signals for the stream buffer, as will be described.

STREAM BUFFERING

Figure 4:
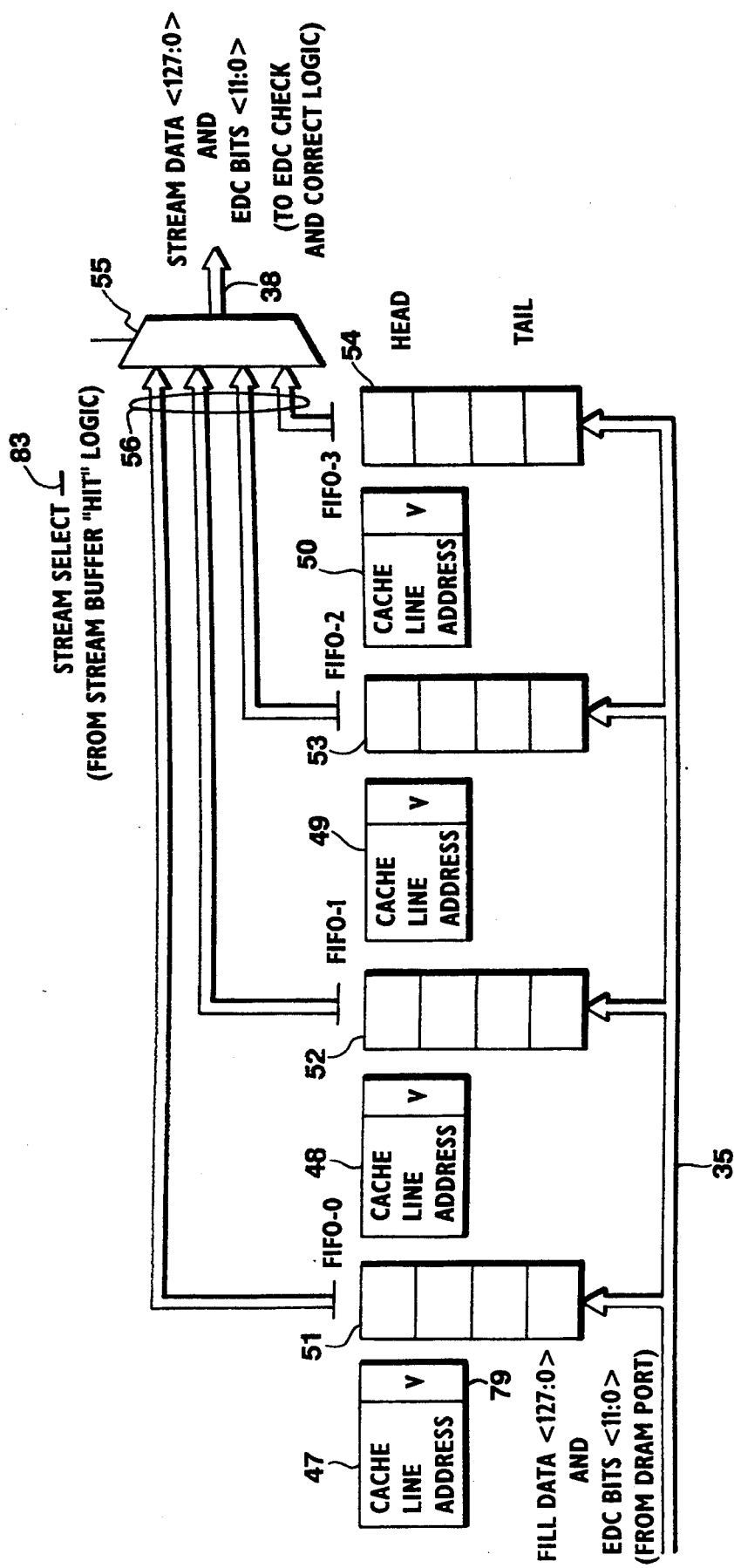
FIG. 4 is a diagram in block form of stream buffer FIFO logic used in the controller of FIG. 3, according to one embodiment.

Referring to FIG. 4, the stream buffer 15 is configured in the example embodiment as four FIFO buffers 51, 52, 53 and 54. Each of the FIFOs holds up to four data blocks, with each data block containing 128-bits of data plus the 12-bit EDC check bit field, as seen in the Figure. Each FIFO has an associated head address register, shown in FIG. 4 as 47, 48, 49 and 50, that maintain the effective cache line address of the data currently held in the head of the corresponding FIFO. In addition to holding the cache line address, each of the head address registers provides a valid bit which indicates whether the corresponding FIFO has valid data at its head location. The four FIFOs rely on a single control mechanism to perform the loading of read data from the DRAMs of memory 12 via lines 35 into the tail of the FIFO, and the subsequent extraction of read data from the head of the FIFO for delivery via output 38 to the system bus 11. A multiplexer 55 selects one of the four 140-bit outputs 56 from the FIFOs to apply to the lines 38 when a stream buffer hit is detected.

Figure 5:
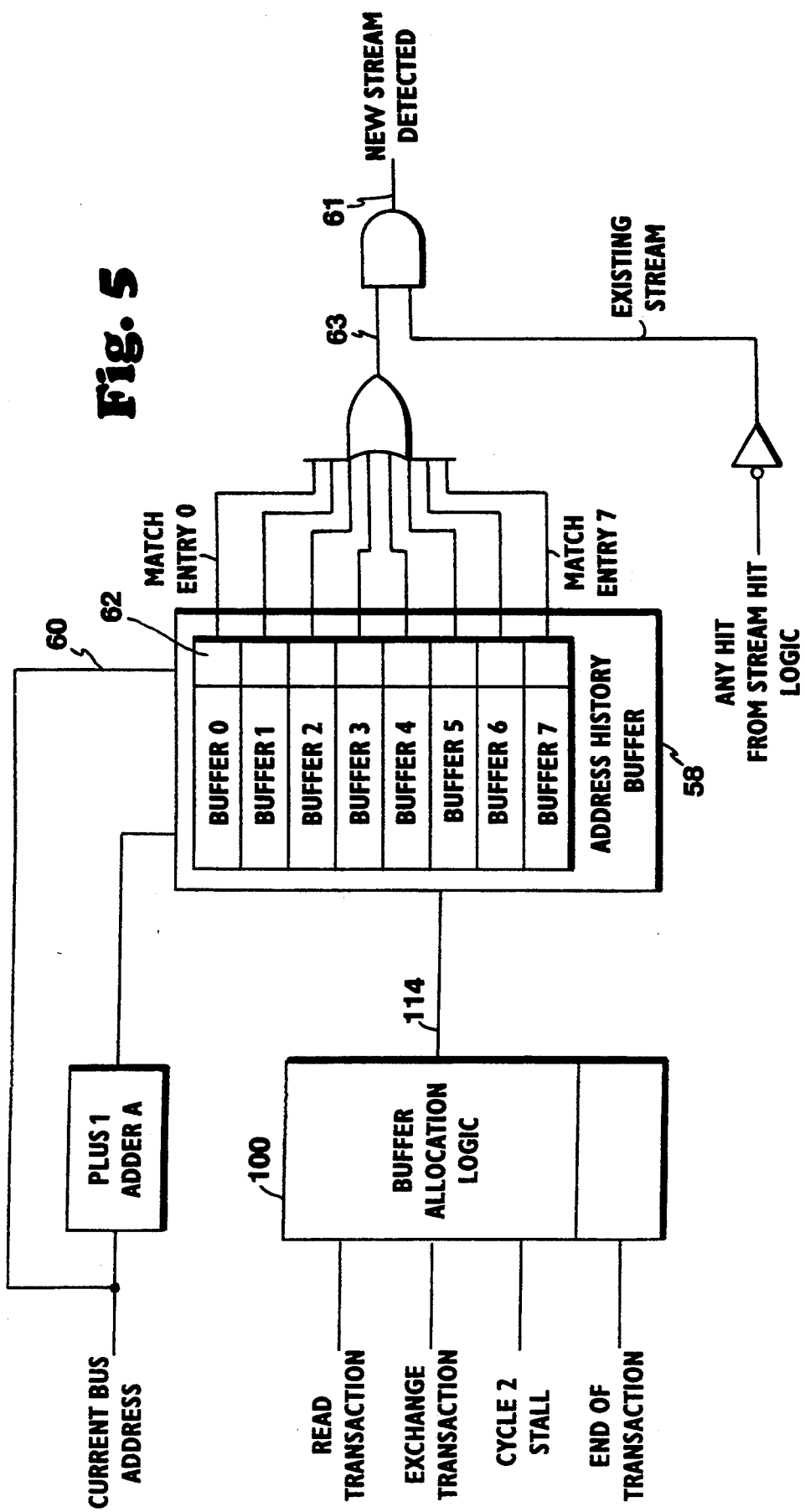
FIG. 5 is a diagram of stream detection logic used in the controller of FIG. 3, according to one embodiment.

The stream detection logic of FIG. 5 is part of the controller 14 and is used to determine when a CPU 10 is in the process of reading contiguous memory locations. The intent of the detection logic is to anticipate the subsequent need for data from memory 12, prior to the actual read command arriving in unit 14 requesting that data. The stream detection logic, in essence, simply keeps a record of the previous eight read transaction addresses made to memory 12. This record is kept in a history buffer cache 58, which has 8 locations Buffer 0 through Buffer 7. The first location, Buffer 0, is loaded from the incoming read cache line address through +1 adder A which increments the incoming read cache line address prior to loading it into Buffer 0. When the next read request is received the corresponding cache line address is incremented by +1 adder A before being loaded into Buffer 1, and likewise each subsequent read address received from CPU 10 is incremented and loaded into the next location, proceeding through Buffer 7, whereupon the ninth read request has its cache line address incremented and loaded into Buffer 0, thus overriding the previous contents of that buffer. In this manner the eight locations within the history buffer cache are used in a true round-robin basis, such that at any given time the history buffer contains the cache line addresses of the last eight read requests.

Incremented addresses are stored so that history buffer contents can be quickly compared to bus addresses in order to detect read streams. To determine whether to prefetch data, the current bus address must be compared with the contents of the history buffers registers to see if the addresses represent read request to sequential addresses. Incrementing the address before storing saves time by preparing the address for comparison prior to arrival of subsequent addresses on the bus therefore eliminating the delay involved in decrementing the current bus address prior to performing the comparison.

Connected to address history buffer 58 is buffer allocation logic circuit 100. This circuit is used to ensure that the buffers are allocated in a round robin basis and to determine which of the bus transaction addresses will be stored in address history buffer 58, as will be explained in more detail with reference to FIG. 7.

The address history buffer 58 operates by receiving an incoming read address on line 60 and comparing it to the output of each of buffers 0–7 to see if the new address of an incoming read request is contiguous to any of the recorded addresses held in the history buffer. If the incoming address is contiguous to any one of the previous eight addresses in the address history buffer 58, a match entry signal indicative of which sequential request is output on line 63. To ensure that the match detected is not indicative of a previously existing stream, the match entry signal is ANDed with an existing stream signal of the stream hit logic of FIG. 10. If the stream has not previously been detected a new stream signal is output on line 61 and one of the stream buffers 51 through 54 of FIG. 4 is allocated, to store prefetched data from the memory 12.

The re-detection of existing streams is prevented by first calculating the effective array address from the new address on bus 11, and then comparing that to the entries already contained within the head address registers 47–50 for the four stream buffer FIFOs 51–54. The same address generation logic used by the fill logic can be used for this purpose. If the head of any of the stream buffer FIFOs 51–54 has an entry that corresponds to the effective array address, the "existing-stream" signal will inhibit the creation of a new stream.

Each location buffer 0 through buffer 7 within the address history buffer 58 also maintains a single status bit 62, which is referred to as the valid bit. Each valid bit is set whenever a new read address is loaded into the corresponding history buffer 0 through buffer 7. Each valid bit indicates whether the contents of the corresponding location buffer 0 through buffer 7 was loaded during normal system operation, and therefore protects against spurious operation as a result of initialization after the system is powered up. If the valid bit 62 is set in a history buffer location, that location is prevented from making a successful compare against any new address, and therefore cannot cause a stream to be detected.

The stream detection logic circuitry is illustrated in FIG. 5, for one embodiment of the invention. This circuitry is shared by all the stream buffers, i.e., only one copy of the stream detection logic is required.

The purpose of history buffer allocation logic 100 is to prevent the addresses of CPU read request that do not benefit-from stream buffering from being stored in the history buffer. One such transaction is the cycle-2 stall exchange. When the dirty data is in the CPU's internal cache, as it is in the cycle-2 stall exchange, nothing prevents the CPU from reading the replacement data from the DRAM during the period the bus is stalled to retrieve the dirty cache line from the CPU's internal cache. The time it takes to retrieve data from the CPU's internal cache is more than sufficient for the replacement data to be retrieved from the DRAMs, thus cycle-2 stall exchange transactions do not benefit from the reduced read latency provided by prefetching data using stream buffering. If a stream buffer were to be allocated for sequential cycle-2 exchange transactions such that data could be provided without any delay, that resource would be wasted because the bus would not realize any benefit from having a zero latency memory retrieval because the bus must be stalled to allow for retrieval of data from the CPU's internal cache.

Figure 6:
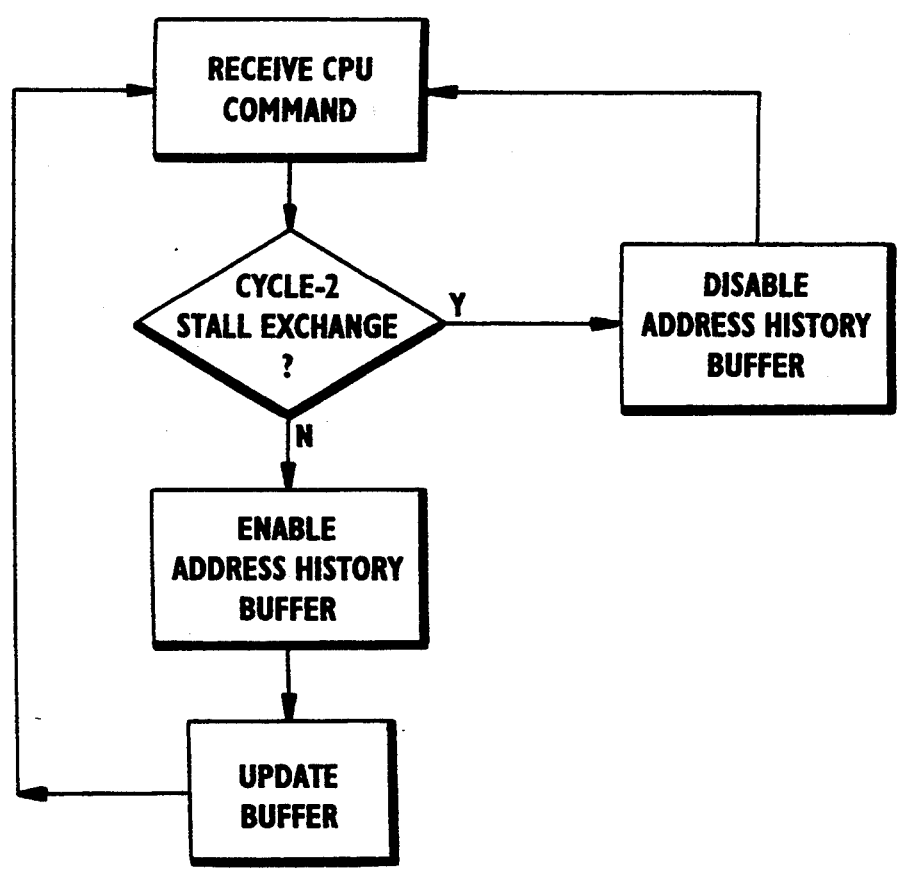
FIG. 6 is a flowchart illustrating the operation of the history buffer-allocation logic of FIG. 7.

With reference to FIG. 6, the history buffer allocation logic 100 monitors commands from CPU 10 to determine whether the current bus transaction is a cycle-2 stall exchange. If the command portion of that request is indicative of a cycle-2 stall exchange the address history buffer is disabled, thus preventing the address history buffer from storing the address portion of that command. History allocation logic 100 is then ready to receive the next CPU command. If the CPU command is not a cycle-2 stall exchange, the address history buffer is enabled, one of the history buffers updated with the CPU command address, and history buffer allocation logic 100 is readied for the next command from the CPU.

Figure 7:
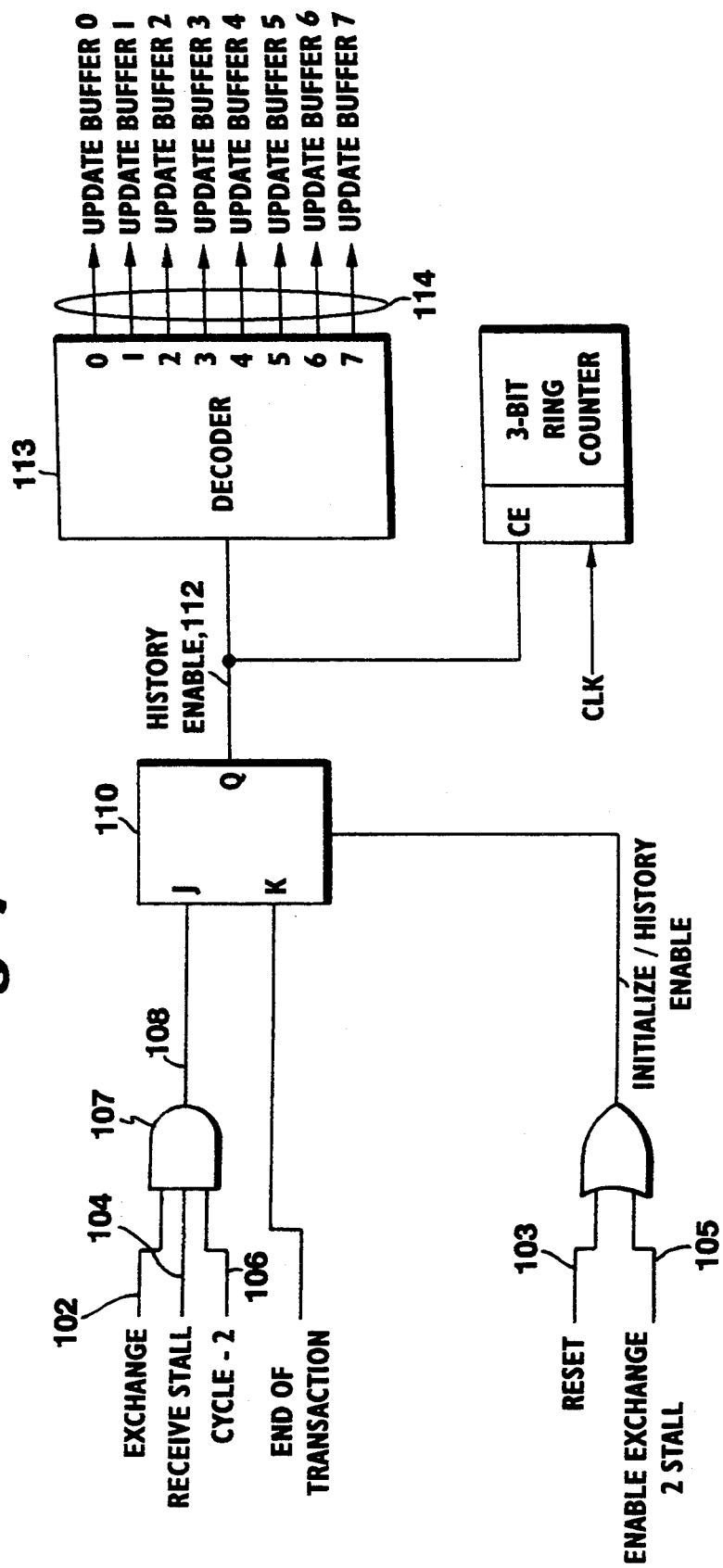
FIG. 7 is a diagram of history buffer-allocation logic used in the stream detection logic of FIG. 5, according to one embodiment.

The specific circuitry of history buffer allocation logic 100 is shown in FIG. 7. When the CPU 10 issues a request the command portion of that request is indicative of the type of request being made. If the command from the CPU 10 is a cycle-2 stall exchange signals indicative of an exchange, a stall, and cycle-2 are input on lines 102, 104, and 106 respectively. AND gate 107 produces a cycle-2 stall exchange signal on line 108. The cycle-2 stall exchange signal along with the end of transaction signal from the control and status registers (CSR) toggle flip-flop 110 thus disabling the history entry signal on line 112 and preventing the cycle-2 stall exchange address from being stored in the history buffer. For any other type of transaction the output on line 112 would be such that decoder 113 is enabled and a signal indicating that one of buffers 0 through 7 should be updated is output on one of lines 114.

The ability to prevent addresses of cycle-2 stall exchange transactions from being stored in the address history buffer can be enabled or disabled by the enable exchange 2 stall signal on line 103 from the CSR. Additionally, at bus power on the reset signal on line 105 is used to initialize the flip-flop.

In addition to the improper allocation of streams to cycle-2 stall exchange transactions, certain read transactions have been identified as improper candidates for the creation of streams and thus the prefetching of data. The following sequence of transactions often occurs on the bus 11:

---

...
Read X
Write X
Read X + 1
...

---

According to stream buffer operation, because this set of transactions contains read requests to sequential addresses a stream will be detected and data will be prefetched to and stored in a stream buffer. However, this particular set of transactions occurs often and in a relatively high number of those occurrences the CPU does not make read request to further consecutive addresses. Thus, a stream has been detected and a buffer allocated and filled with prefetched data that is never used. Not only does such needless prefetching hurt processing time, but it could also cause a stream buffer containing good data to be cleared and filled with useless data.

Figure 8:
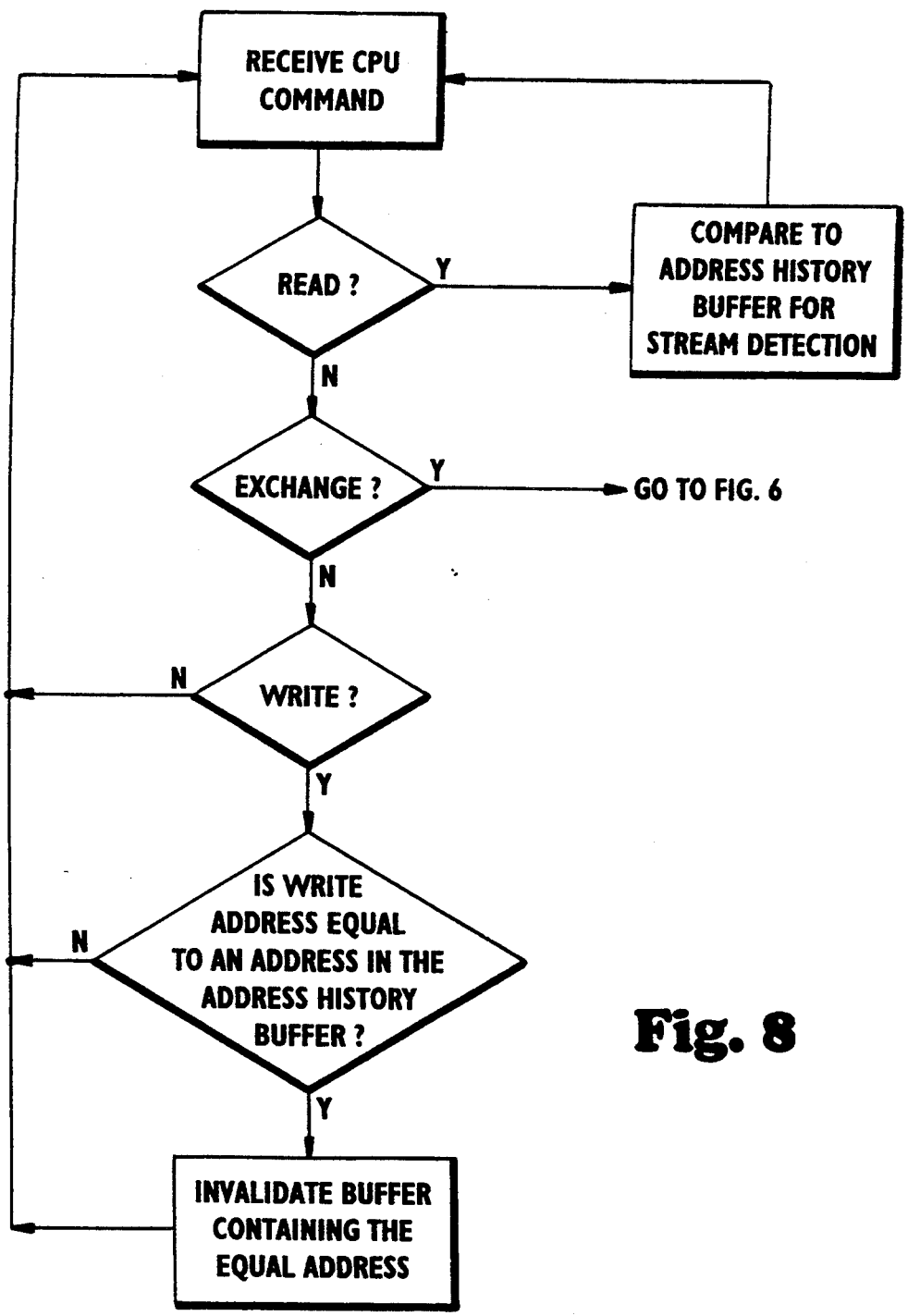
FIG. 8 is a flowchart illustrating the operation of the history buffer-invalidate logic of FIG. 9.

In order to assure that stream buffers 51 through 54 contain desirable data, the stream buffer detection logic of FIG. 5 may contain a history buffer invalidation circuit that operates as outlined in FIG. 8. Each command from the CPU is monitored to determine the type of transaction. If the command is a read command, the address portion of that command is compared with the contents of the address history buffer 58 for the purpose of stream detection. An exchange command from the CPU is handled as outlined above with reference to FIG. 7. Each write command address is compared with the contents of address history buffer 58 to determine whether the write command address is to an address identical to one of the stored read command address. If the address of the write command is equal to an address stored in the address history buffer 58, the particular buffer containing that address is disabled, thus preventing its contents from being compared with subsequent address of CPU commands to detect streams and prefetch data.

Figure 9:
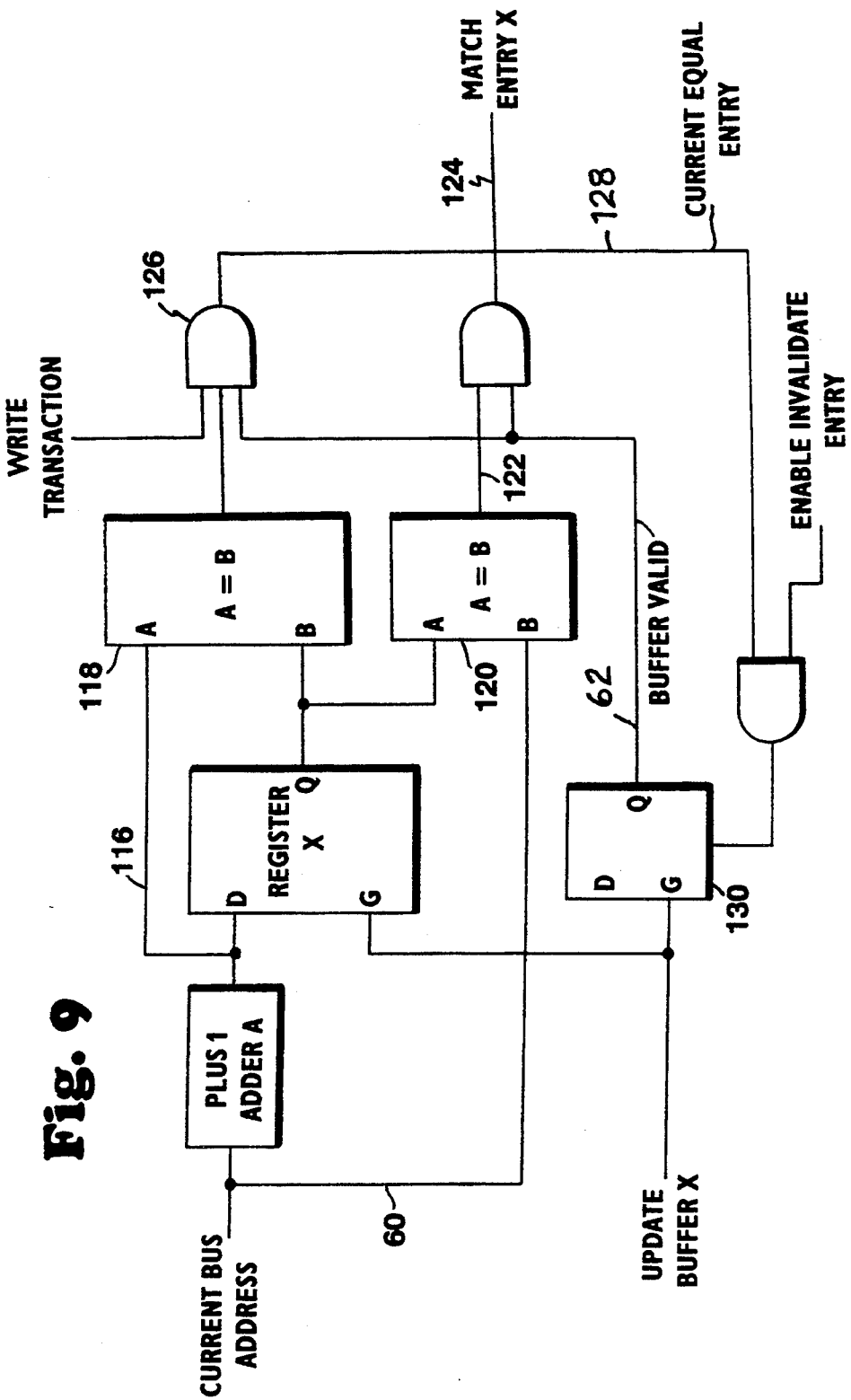
FIG. 9 is a diagram of history buffer-invalidate logic used in the stream detection logic of FIG. 5, according to one embodiment.

With specific reference to FIG. 9, the incremented address of the each bus transaction is stored in one of eight history registers. FIG. 9 illustrates one history buffer X. The current bus address is fed into the history buffer on line 60. The contents of history buffer X are compared with the current bus address in comparator 120. If the current bus address and the address in history buffer X are the same a match signal is output on line 122. If the valid buffer bit 62 indicates that the contents of history buffer X are valid, a match entry X signal indicating that data should be prefetched is output on line 124.

Additionally, each current bus address must be stored in a history buffer register. If the update history buffer signal on line 114 from the history buffer allocation logic 100 of FIG. 5 allows that bus transaction to be stored, the current bus is incremented in +1 Adder A, and then stored in history buffer register X. Subsequent bus transaction addresses are incremented and compared with the contents of each history buffer register. For example, the contents of history buffer register X are compared in comparator 118 with the incremented current bus address. The output of comparator 118 is qualified with a write transaction signal and buffer valid signal in AND gate 126 to determine if the current bus tramaction is a write transaction to the same location as the read tramaction address stored in the history buffer register. If so, a current equal entry signal is output on line 128. The current equal entry output in conjunction with the enable invalidate entry from the CSR are used control flip-flop 130, thus, preventing history buffer X from being used for stream detection.

Figure 10:
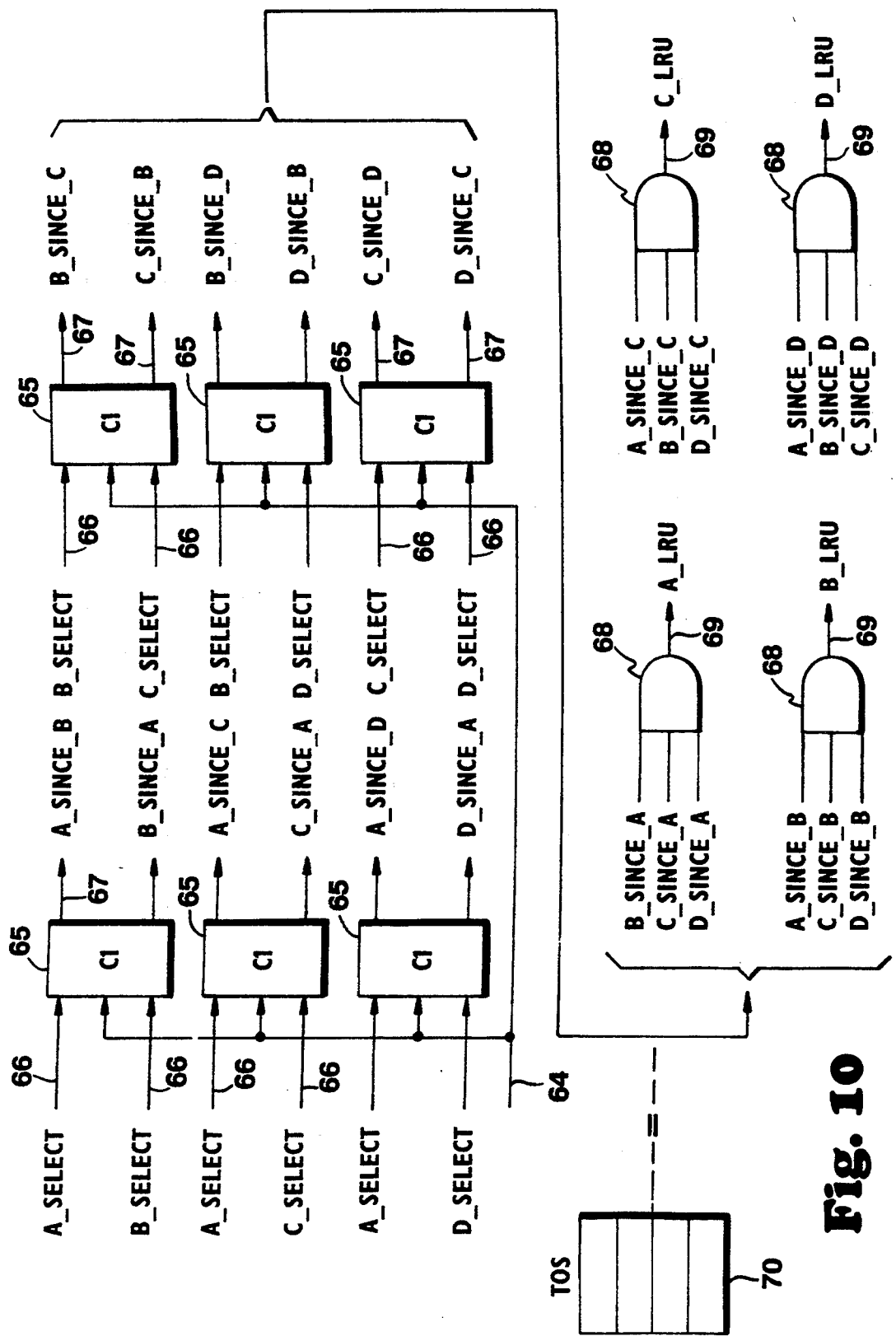
FIG. 10 is a diagram in block form of stream buffer-allocation circuit used in the controller of FIG. 3, according to one embodiment.

The stream buffers 15 are allocated on a modified "least-recently-used" (LRU) basis, as managed by the stream buffer allocation circuitry shown in FIG. 10; this circuitry is also part of the controller 45. The allocation circuitry is shared by all the stream buffers, i.e., only one copy of this allocation logic is required. This circuitry assures that the stream buffers are utilized in the most efficient manner. When a buffer hit is signalled on line 83 by the circuitry of FIG. 12, an input 64 to a set of six J-K flip-flops 65 causes the A-sel, B-sel, C-sel, etc., inputs 66 to be evaluated, and outputs 67 are valid until the next hit. These outputs 67 indicate for each pair of the four buffers 51–54 which one was the most recently used. The outputs 67 are applied as inputs to a set of four AND gates 68, producing outputs 69 in the controller 45 indicating which one of the four buffers 51–54 is LRU. When a buffer is selected at the next hit, it will thus be the one indicated by the one output 69 that is asserted. This one output 69 is then deasserted, and the next LRU is asserted (one of the other outputs 69 is asserted). In effect, the logic provides a stack 70 of four buffer identities to indicate the relative time between successful hits on each of the four buffers 51–54. When a buffer 51–54 is allocated upon the event of a hit, the identity of that buffer is placed on the bottom of the stack 70, pushing the other buffer identities up the stack (i.e., as indicated by the order the outputs 69 will be asserted). As time progresses, memory read tramactions that hit on the contents of a buffer 51–54 push the corresponding buffer identity to the bottom of the stack 70. The buffer identity on the top of the stack is always the LRU buffer, and would therefore be the next buffer to be allocated when the next new read stream is detected. In the event that a stream buffer 51–54 is invalidated as discussed below, the identity of that buffer is placed immediately at the top of the stack 70, and that buffer will be the next buffer to be allocated when the next read stream is detected.

Figure 11:
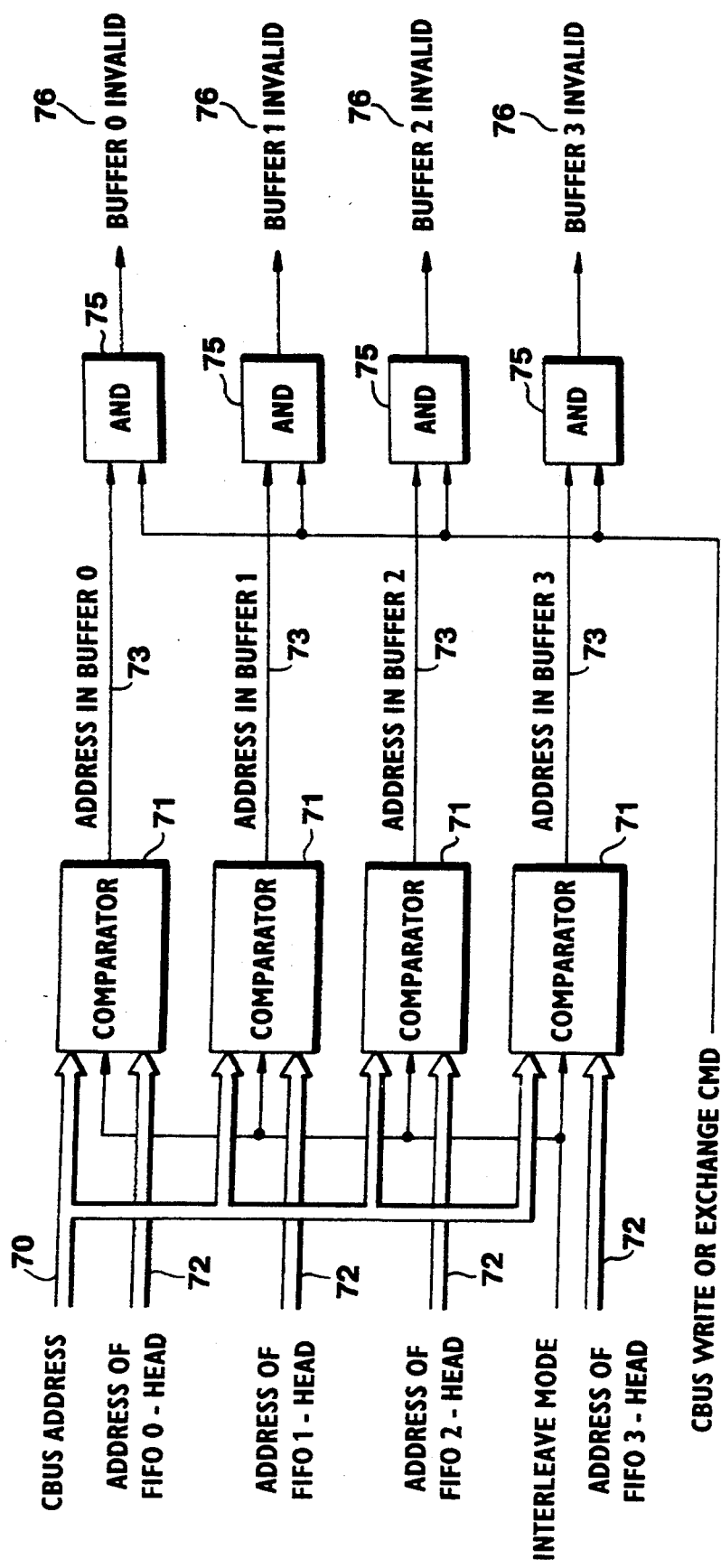
FIG. 11 is a diagram in block form of stream buffer-invalidate circuit used in the controller of FIG. 3, according to one embodiment.

Referring to FIG. 11, the stream buffer invalidate circuit is shown in detail. Data in the stream buffer 15 can become "stale" when a write-to-memory operation occurs for a memory location contained in the buffer 15. In order to assure that the read data residing in a stream buffer 51–54 is always "coherent," all system memory write transactions are checked to see whether an address of the write operation appearing on the bus 11 coincides with an existing stream buffer 51–54 entry. Each write transaction address on input 70 from the bus 11 (e.g., from latch 21) is compared in four compare circuits 71 with inputs 72 from the four stream buffer head address register entries 47–50, producing four comparison outputs 73; these outputs 73 are each ANDed with a write command signal from the bus 11 in gates 75, producing a "buffer invalid" output 76 for each of the four stream buffers; this output 76 is used to toggle the valid bit 79 for the corresponding buffer location. If a write transaction address on input 70 from the bus 11 is equal to any address potentially residing in a stream buffer, that entire stream is declared invalid, thus preventing any of the data in that stream buffer from being erroneously supplied to CPU 10. Once a stream buffer is invalidated it is available to be reallocated to the next detected read stream.

In addition to the invalidation of individual streams (individual buffers 51–54) due to memory write or memory exchange commands, all four stream buffers 51–54 are invalidated at any time the memory configuration control register is written, and at any time that a command parity error is detected. In the case of rewriting the configuration register, re-configuration of the memory module address or interleaving assignments makes the address relationship of the contents of the stream buffers 51–54 incoherent, while in the case of command parity error the failed transaction may have been a write or exchange to a memory location whose data is currently resident in a stream buffer entry, and which under normal conditions (i.e. no command parity error) would have resulted in an invalidation of the appropriate stream buffer. These functions protect against the possible reading of "stale" or incoherent data.

Figure 12:
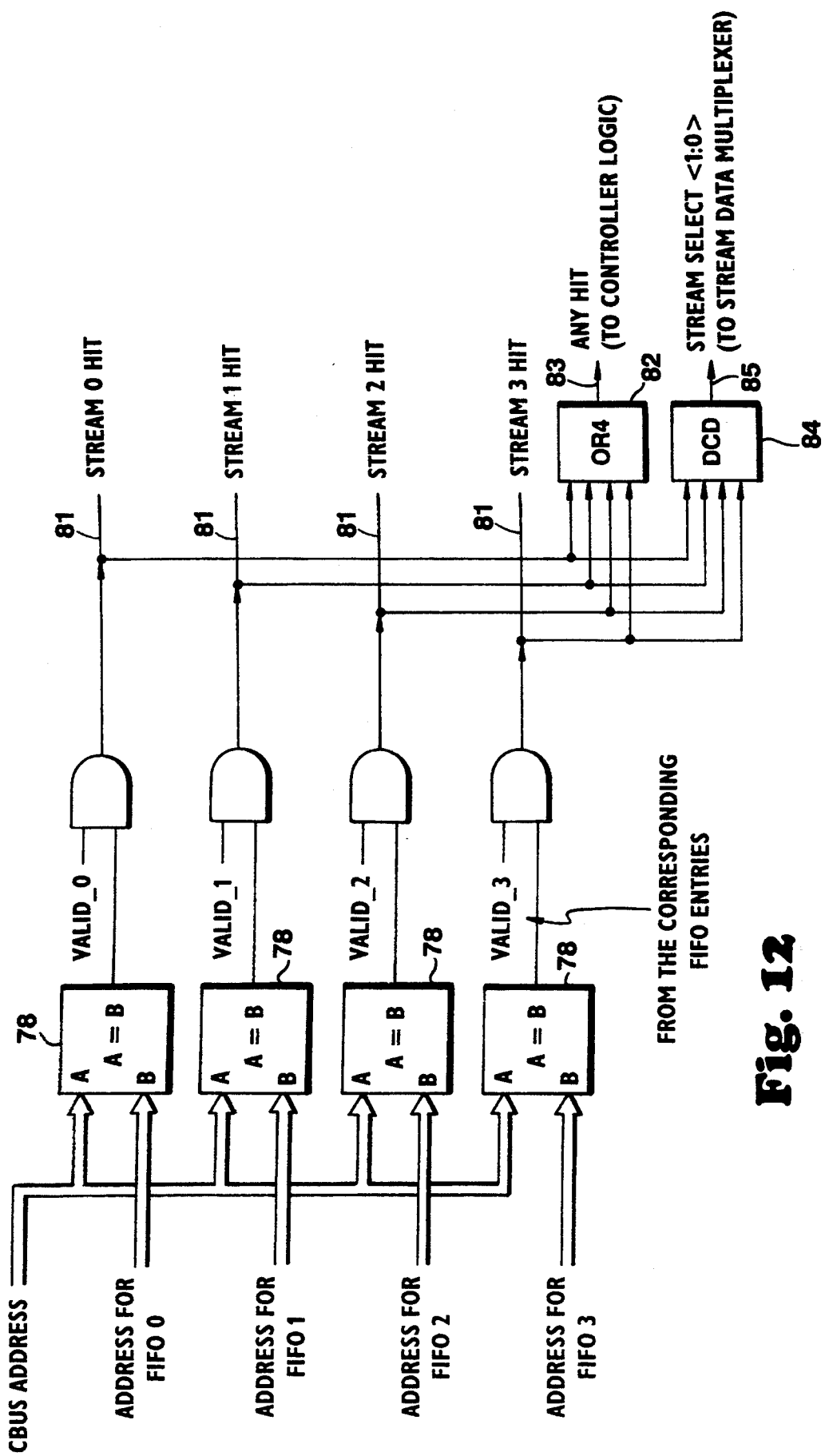
FIG. 12 is a diagram in block form of stream buffer-hit logic circuit used in the controller of FIG. 3, according to one embodiment.

Once a stream buffer 51–54 has been allocated and some amount of prefetched data has been placed in the FIFO, the stream buffer hit logic of FIG. 12 compares incoming read or exchange command addresses to detect a comparison between the requested address and the address of the data at the head of each stream buffer FIFO entry. If a compare of these two addresses is successful, read data may be delivered directly from the stream buffer 51-54 to the system bus 11, without performing a (much slower) access to the DRAMs of memory 12. Read latency should be reduced to the minimum architected read transaction delay (i.e., "zero stall states") of seven system bus cycles (for an example embodiment) upon a successful hit on a stream buffer.

The circuitry of the hit logic of FIG. 12 shows the logic supporting "hit" detection for one embodiment. As there are four stream buffers 51-54, four comparisons are performed in parallel in the comparators 78. The outputs of the comparators 78 are gated by the state of their respective valid bits 79 which exist within each of the stream head address register entries 47-50. If any of the resultant hit signals on lines 81 become asserted during a read (or exchange) operation, an OR gate 82 produces a "hit" signal on line 83 to inform the memory control and system bus control logic which will supply the appropriate sequencing of the memory 12 to account for shorter read latency, and will inhibit DRAM accessing of the memory 12. Additionally, the four hit signals on lines 81 are combined in a coder circuit 84 to generate a 2-bit stream select on lines 85. The stream select is used to gate the correct FIFO data through a 4:1 multiplexer 55 to the lines 38 on the way to the system bus 11.

PAGE MODE OPERATION

The stream buffer is particularly suitable for use with DRAM memory devices implementing page mode. A DRAM device of the type commercially available in 1-Mbyte and 4-Mbyte sizes has a row length of say, 512, 1024 or 2048 cells (depending upon layout of the chip), and when a read access is made using a row address and row address strobe (RAS), any of the columns of this row may then be accessed (without asserting a new row access) by merely toggling column address strobe (CAS) and asserting a new column address, as illustrated in FIG. 13. The page mode access time is much shorter than RAS-CAS access time.

When either a new read stream is detected, or a continuing read stream causes a stream buffer 51-54 to transition to an "empty" condition, the stream buffer fill circuit in controller 14 fetches data from the appropriate DRAM address in memory 12 and place it into the desired stream buffer FIFO 51-54. The stream buffer logic generates the correct DRAM address from the incoming memory address, complete with appropriate incrementing, while accounting for interleaved configurations and the effect on the availability of page mode accesses of the DRAMs of the memory 12.

In Tables 1 and 2 the address bits used to address the memory 12 are shown in the left-hand column (called Logical Signal); these include row address bits 0-9 and column address bits 0-9 (called RW Col Bits or read/- write column bits) plus read/write bank select bits 0-1 and board select bits 0-8. For exchange operations, a different combination is used for the column address, bank select and board select as shown. In the six right-hand columns the address bits of the bus 11 (CAD or command/address/data bits) are shown. Note that a gap exists between CAD bits <31> and <64> because in the example embodiment the memory system is implemented in two slices, using a 128-bit bus 11. The command/address/data for each half is sent separately on the bus 11, using bits <31:0> and <95:64> for one half and bits <63:32> and <127:96> for the other. Thus the Tables 1 and 2 represent the address bits on bus 11 for one half, and corresponding numbers would be used for the other half.

A memory system can be constructed using 1-M, 4-M, or 16-M DRAM devices, for example, and the boards laid out to provide one-way, two-way or four-way interleaving. In an example embodiment, "by-4" DRAM devices are used. Two or four banks of DRAMs may be used in the configuration, using the address transposition set forth in Tables 1 and 2. This provides a memory size for the memory 12 of 16-Mbyte or 32-Mbyte if 1-Mbit DRAMs are used, or 64-Mbyte or 128-Mbyte if 4-Mbit DRAMs are used.

The principle used in selecting the address bit transposition in Tables 1 and 2 is that the row address bits going to the DRAMs in memory 12 are a subset of the index address (i.e., tag bits are not used as row address bits).

Referring to Table 1 and Table 2, when the memory is configured under oneway interleaving, the two least significant column address bits correspond to the two memory bus address (bus 11) least significant bits, and therefore the array module is capable of performing up to four page mode read cycles. This means that, once a DRAM address is established when filling a steam buffer entry, successive page mode reads can be performed, filling multiple locations in the stream buffer, at substantially higher performance than if a corresponding number of entries were to be filled using a full RAS-CAS read cycle for each entry.

Tables 1 and 2 also illustrate that configuring the array module under two-way interleaving causes the memory bus least significant bit (LSB) to become part of the board select field, leaving only the next higher LSB for use as the column address LSB. Therefore, a maximum of two page mode cycles may be performed under this configuration for the purpose of quickly filling a stream buffer. Further, if the memory module is configured under four-way interleaving, neither of the memory bus address LSBs correspond to the column address LSBs, and therefore no page mode read operations are possible. Any filling of a stream buffer in this case must be done as individual RAS-CAS read operations to the DRAMs.

Table 1 and Table 2 provide the matrices used to manipulate the incoming memory bus address to provide for proper board select, bank select, and DRAM address generation, for 1-Mbit and 4-Mbit DRAMs, respectively. Additionally, the effects on various configurations on the column address bits involved in the stream buffer fill logic are shown.

There are three methods in which the adaptive look ahead buffer fill cycle optimization balances the memory resources. These are: (1) adjusting the size of the fill based on the mode of interleaving, (2) dynamically adjusting the size of the fill to minimize read latency as seen by the requesting node, and (3) aligning the fill address to the beginning of a page.

The first method uses the interleaving configuration mode of the memory module in the system and from that information determines the number of look ahead locations it should read from memory and store in the buffers 51-54. This is based on Table 1.

For the four-way interleaved module only one fill read is performed because there typically will be three sequential reads (one read to each of the other three modules in the four-way interleaved set) before the next time the process comes back to read the data that ideally will already be resident in the stream buffers. Thus, there are three transaction periods that are opportunities for a given module to fulfill the look ahead fill read operation, without adding delays to the next read operation in the stream to that module.

In the two-way interleaved case the frequency of reads to a single module by a single process can double from the four-way interleaved case, because a sequential read stream will land on a particular module one out of two instead of one out of four times. Therefore by doubling the number of fills performed for a given memory cycle the number of times the memory must be accessed is equal to the number of times the memory must be accessed for a four-way interleaved module. By the same reasoning that the number of reads is doubled for a two-way board, the number of reads for the one-way interleaved configuration is quadrupled, where all reads in a stream are to a single memory module.

The second mode of optimization is the ability to dynamically change the number of appended fill read cycles depending on the activity on the system bus 11. If a fill transaction is already active on a memory module and a new transaction is initiated by the CPU that is not to the stream buffer being filled, then the control logic 45 will truncate the fill operation at the end of the current memory cycle although some location(s) within the stream buffer may not have been filled yet. This allows the new transaction to proceed without incurring the additional delays of completing the entire fill operation.

The third mode of operation is where the fill controller will align the address of the last location to be read with the last location available for page mode reads to the DRAMs. In detail, the fill controller will avoid generating a fill operation that would cross an address boundary corresponding to the size of the maximum fill operation (e.g., four blocks if one-way interleaved). Instead, the fill controller will only perform fills that end at the appropriate address boundary for the given interleave mode. Then, when the next stream buffer fill operation is required to refill that stream buffer, the fill controller will perform a fill that starts on the appropriate address boundary and proceeds for the appropriate number of page mode read cycles before completing the fill operation. In this manner, the most efficient page mode read operations are used to refill the stream buffers when required.

Without these methods of optimization the stream buffers 51-54 could have a negative impact on system performance by delaying memory accesses received from the system bus 11 that miss the stream buffers until an ongoing fill is completed. This increase in latency causes the requesting CPU 10 to wait even longer for data to be returned and ties up the system bus 11 so that it is unavailable for other system elements.

The use of these optimization features significantly reduces the potential negative impact to the system performance by balancing the stream buffer maintenance with the resources required by other system elements. This results in faster completion of memory accesses and consequently and improvement of peak memory throughput.

The appended fill operation used in one embodiment of the invention is initiated by a read transaction on the bus 11 to an address that does not match the addresses of existing prefetched data in the stream buffers 51-54, i.e., a miss in the stream buffer 15. The address of this read is checked to see if there is an opportunity to perform page mode read cycles. The page mode opportunity is defined as having sequential addresses available to do page mode cycles. Because the memory module supports exchange operations a unique definition of the address bits is used as shown in Tables 1 and 2. Without this definition support for exchange operations and page mode DRAM operations are mutually exclusive. Referring to FIG. 14, the address from bus 11 for this read is applied to the DRAMs via multiplexer 86, and the read operation proceeds, accessing memory 12 using RAS and CAS generated by address strobe generator 86a, resulting in data being sent back to CPU in the usual manner for a read. If page mode read locations are available then the memory control 86b of FIG. 14 (part of controller 45) is notified and makes provisions to append page mode read operations to the end. That is, before RAS is brought high (deasserted), new column addresses will be sent to the memory via input 86c to the multiplexer 86, and the generator 86a will apply another CAS for each new column address. The address is incremented to the next location by logic 86d and provided to the DRAM address multiplexer 86 where it is available when the normal read operation concludes. The controller 86b selects the normal address or the page mode append address by output 86e to the multiplexer.

Thus, when the normal read operation concludes, the controller selects the appended page mode read address and blocks the negation of the RAS strobe to the DRAMs, thus keeping the DRAM active for accessing any column of the addressed row without a new RAS cycle. The CAS strobe is negated normally, but after the appended page mode read access has been driven out to the DRAMs via multiplexer 86, the generator 86a reasserts CAS which reads the next sequential location which is selected by the appended page mode address. The address is then incremented to point to the next sequential location. This operation of providing an address and cycling CAS is repeated until all of the available page mode locations have been read.

The appended fill cycle operation functions to allow for the attaching of sequential memory access to the end of an existing memory access, thus prefetching memory data from the next sequential location. Because this access is appended to an existing DRAM read operation the data from the next sequential location can be retrieved and stored in the faster access buffer 15 before the current transaction on the bus 11 is completed. Thus the read latency is now a function of the bus protocol and not the DRAM read access time, allowing the bus 11 to run at its peak bandwidth. Without using this append operation, in order to read sequential locations the controller 14 would have to initiate individual DRAM read operations for each location. If this were the case the sequence to read sequential locations would require that the DRAM operation terminate normally, wait for the minimum precharge time between DRAM accesses (as specified for the DRAM devices) then initiate a new DRAM read operation. In the time needed to perform two individual DRAM accesses, the appended read can perform four read accesses, since the page mode access time is much less than RAS-CAS access time, and the precharge part of the cycle time is not imposed for each page mode cycle.

Figure 15:
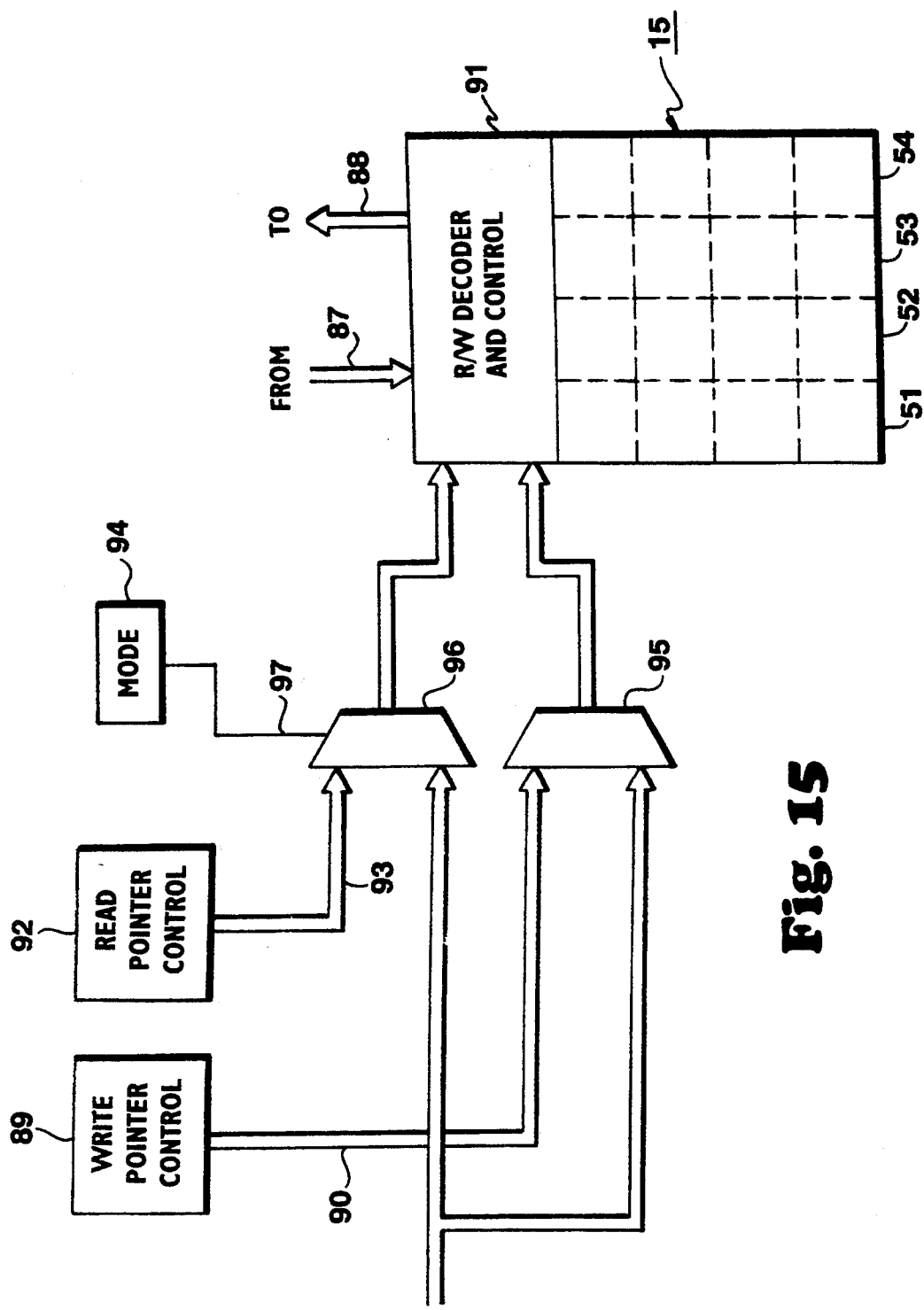
FIG. 15 is an electrical diagram in block form of the stream buffer used in the module of FIG. 3, according to one embodiment.

Referring to FIG. 15, the stream buffer 15 is constructed as a high-speed RAM, used to store data read from the slower memory 12. A dual-port configuration is used, having a separate write port 87 and read port 88. The RAM is organized as sixteen locations of 140-bits each. A write pointer control 89 in the controller 45 calculates the location of data to be supplied to the CPU within the RAM and produces a 4-bit (1-of-16) selection on lines 90, referred to as the write pointer. The write pointer on lines 90 is applied to a decoder in the read/write control 91 for the RAM to select one of the sixteen locations (four buffers 51–54 with four entries per buffer). A read pointer control 92 in the controller 45 calculates the location within the RAM that the data read will be read from and supplied to the CPU 10, and produces a 4-bit (1-of-16) selection on lines 93, referred to as the read pointer. This read pointer on lines 93 is applied to the read/write control 91 for the RAM to select one of the sixteen locations.

During normal operation of the stream buffer, neither the read or write pointers on lines 90 and 93 have a fixed relationship to the physical address sent from the CPU 10. This makes addressing the RAM buffer 15 for testing a difficult or impossible chore. According to a feature of the invention, a test mode of operation provides a direct-address or fixed relationship between the memory read and write command addresses and the read and write pointers, thus simplifying diagnostic testing of the system. A mode control bit 94 is included in the controller 45, implemented by a flip-flop. This mode control is set or reset by a command written to the memory controller 14 from the CPU 10. When status bit 94 is in the "1" state, the system is in the direct read/write mode (test mode) so that addresses sent from the CPU 10 to the controller 14 will directly select one of the sixteen locations of the read buffer 15. When the bit is in the "0" state, direct read/write is disabled (normal mode of operation is employed). When direct read/write is enabled, all memory read and write operations are directed to the stream buffer 15 (not to the memory 12) so that all write data is written directly into the stream buffer memory 15 and read data is always obtained from the stream buffer 15. Multiplexers 95 and 96 are placed between the write and read pointer controls 89 and 92 and the read/write port control 91. One set of inputs to the multiplexers are the lines 90 and 93 (for normal operation), while the other set of inputs receive the address bits directly from the bus 11 (via latch 21). The multiplexers are selected by an output line 97 from the mode bit 94. In operation, for a test mode, the mode bit 94 is written with a "1" by the CPU 10, placing the buffer 15 in the direct read/write mode. All subsequent write commands issued by the host computer CPU 10 cause the write data issued by the CPU 10 to be stored directly into the stream buffer 15 at the location specified by the four address bits taken from the address issued by the CPU 10 (other address bits are ignored), passed through the multiplexer 95 and applied to the read/write control 91 of the RAM 15. All subsequent read commands issued by CPU 10 cause the same four address bits to be taken from the CPU address on bus 11, passed through the multiplexer 96, and applied to the control 91 from the RAM, where they are used to select 1-of-16 RAM locations. Data thus accessed in the RAM is sent to the CPU 10 as read data.

Ideally, for greatest flexibility in use, it is desirable to use the low-order address bits to select locations within the stream buffer 15. However, in order to accommodate interleaved operation of system memory modules in memory 12, and still maintain a coherent direct addressing scheme for the stream buffer memory, it is necessary to use different bits from the system memory address on bus 11 for different interleaving schemes. As low-order address bits are typically used to select different memory modules while in a two-way or four-way interleaving mode, the address bits chosen from the system memory address on bus 11 must be shifted "higher" one or two bit positions before being applied to the decoding logic. By correctly choosing address bits, the appropriate stream buffer location can be selected while still respecting the differing interleaving schemes. In particular, for one-way interleaving (i.e., no interleaving) the address bits $<8:5>$ from the bus 11 are used to select the locations of the buffer 15 as follows:

| Memory Address Bits | | | | |
|---|---|---|---|---|
| $<8>$ | $<7>$ | $<6>$ | $<5>$ | Stream Buffer Entry Selected |
| 0 | 0 | 0 | 0 | Buffer-0, Entry-0 (Head) |
| 0 | 0 | 0 | 1 | Buffer-0, Entry-1 |
| 0 | 0 | 1 | 0 | Buffer-0, Entry-2 |
| 0 | 0 | 1 | 1 | Buffer-0, Entry-3 (Tail) |
| 0 | 1 | 0 | 0 | Buffer-1, Entry-0 (Head) |
| 0 | 1 | 0 | 1 | Buffer-1, Entry-1 |
| 0 | 1 | 1 | 0 | Buffer-1, Entry-2 |
| 0 | 1 | 1 | 1 | Buffer-1, Entry-3 (Tail) |
| 1 | 0 | 0 | 0 | Buffer-2, Entry-0 (Head) |
| 1 | 0 | 0 | 1 | Buffer-2, Entry-1 |
| 1 | 0 | 1 | 0 | Buffer-2, Entry-2 |
| 1 | 0 | 1 | 1 | Buffer-2, Entry-3 (Tail) |
| 1 | 1 | 0 | 0 | Buffer-3, Entry-0 (Head) |
| 1 | 1 | 0 | 1 | Buffer-3, Entry-1 |
| 1 | 1 | 1 | 0 | Buffer-3, Entry-2 |
| 1 | 1 | 1 | 1 | Buffer-3, Entry-3 (Tail) |

For two-way interleaving, the address bits are decoded in the same way, except address bits $<9:6>$ are used from the bus 11 instead of $<8:5>$. In like manner for four-way interleaved memory modules, the address bits used from bus 11 are $<10:7>$, but the decoding is otherwise the same as in the table just given.

Complete diagnostic coverage of the memory elements used within the stream buffer 15 are thus obtained, using normal memory read and write protocols provided by the CPU 10 via the memory interconnect bus 11. Additionally, isolation of endors is greatly improved because testing of the stream buffer 15 can be decoupled from functional usage of the device. Without this direct read/write feature of the invention, the testing of such a memory element would be more time consuming, and isolation of some failure would not be possible.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. As one example, logical functions described herein as being implemented in hardware could equivalently be implemented in software (i.e., by preparing a suitable processor) and vice versa, in a manner routine to those of ordinary skill having the benefit of this disclosure. It is therefore contemplated that the appended claims will cover any such modifications or embodiments which fall within the true scope of the invention.

TABLE 1

Addressing Matrix For Modules Using 1MBit DRAMS

| LOGICAL SIGNAL | INTERLEAVE FACTOR WITH 2 BANKS | | | INTERLEAVE FACTOR WITH 4 BANKS | | |
|---|---|---|---|---|---|---|
| | 1-WAY | 2-WAY | 4-WAY | 1-WAY | 2-WAY | 4-WAY |
| ROW BIT 0 | CAD 5 | CAD 5 | CAD 5 | CAD 5 | CAD 5 | CAD 5 |
| ROW BIT 1 | CAD 6 | CAD 6 | CAD 6 | CAD 6 | CAD 6 | CAD 6 |
| ROW BIT 2 | CAD 7 | CAD 7 | CAD 7 | CAD 7 | CAD 7 | CAD 7 |
| ROW BIT 3 | CAD 8 | CAD 8 | CAD 8 | CAD 8 | CAD 8 | CAD 8 |
| ROW BIT 4 | CAD 9 | CAD 9 | CAD 9 | CAD 9 | CAD 9 | CAD 9 |
| ROW BIT 5 | CAD 10 | CAD 10 | CAD 10 | CAD 10 | CAD 10 | CAD 10 |
| ROW BIT 6 | CAD 11 | CAD 11 | CAD 11 | CAD 11 | CAD 11 | CAD 11 |
| ROW BIT 7 | CAD 12 | CAD 12 | CAD 12 | CAD 12 | CAD 12 | CAD 12 |
| ROW BIT 8 | CAD 13 | CAD 13 | CAD 13 | CAD 13 | CAD 13 | CAD 13 |
| ROW BIT 9 | N/A | N/A | N/A | N/A | N/A | N/A |
| RW COL BIT 0 | CAD 3 | CAD 22 | CAD 22 | CAD 3 | CAD 23 | CAD 23 |
| RW COL BIT 1 | CAD 4 | CAD 4 | CAD 23 | CAD 4 | CAD 4 | CAD 24 |
| RW COL BIT 2 | CAD 15 | CAD 15 | CAD 15 | CAD 15 | CAD 15 | CAD 15 |
| RW COL BIT 3 | CAD 18 | CAD 18 | CAD 18 | CAD 18 | CAD 18 | CAD 18 |
| RW COL BIT 4 | CAD 19 | CAD 19 | CAD 19 | CAD 19 | CAD 19 | CAD 19 |
| RW COL BIT 5 | CAD 20 | CAD 20 | CAD 20 | CAD 20 | CAD 20 | CAD 20 |
| RW COL BIT 6 | CAD 21 | CAD 21 | CAD 21 | CAD 21 | CAD 21 | CAD 21 |
| RW COL BIT 7 | CAD 14 | CAD 14 | CAD 14 | CAD 14 | CAD 14 | CAD 14 |
| RW COL BIT 8 | CAD 17 | CAD 17 | CAD 17 | CAD 22 | CAD 22 | CAD 22 |
| RW COL BIT 9 | N/A | N/A | N/A | N/A | N/A | N/A |
| RW BANK SEL BIT 0 | CAD 16 | CAD 16 | CAD 16 | CAD 16 | CAD 16 | CAD 16 |
| RW BANK SEL BIT 1 | N/A | N/A | N/A | CAD 17 | CAD 17 | CAD 17 |
| RW BOARD SEL BIT 0 | CAD 22 | CAD 3 | CAD 3 | CAD 23 | CAD 3 | CAD 3 |
| RW BOARD SEL BIT 1 | CAD 23 | CAD 23 | CAD 4 | CAD 24 | CAD 24 | CAD 4 |
| RW BOARD SEL BIT 2 | CAD 24 | CAD 24 | CAD 24 | CAD 25 | CAD 25 | CAD 25 |
| RW BOARD SEL BIT 3 | CAD 25 | CAD 25 | CAD 25 | CAD 26 | CAD 26 | CAD 26 |
| RW BOARD SEL BIT 4 | CAD 26 | CAD 26 | CAD 26 | CAD 27 | CAD 27 | CAD 27 |
| RW BOARD SEL BIT 5 | CAD 27 | CAD 27 | CAD 27 | CAD 28 | CAD 28 | CAD 28 |
| RW BOARD SEL BIT 6 | CAD 28 | CAD 28 | CAD 28 | CAD 29 | CAD 29 | CAD 29 |
| RW BOARD SEL BIT 7 | CAD 29 | CAD 29 | CAD 29 | CAD 30 | CAD 30 | CAD 30 |
| RW BOARD SEL BIT 8 | CAD 30 | CAD 30 | CAD 30 | N/A | N/A | N/A |
| EX COL BIT 0 | CAD 3 | CAD 72 | CAD 72 | CAD 3 | CAD 73 | CAD 73 |
| EX COL BIT 1 | CAD 4 | CAD 4 | CAD 73 | CAD 4 | CAD 4 | CAD 74 |
| EX COL BIT 2 | CAD 15 | CAD 15 | CAD 15 | CAD 15 | CAD 15 | CAD 15 |
| EX COL BIT 3 | CAD 68 | CAD 68 | CAD 68 | CAD 68 | CAD 68 | CAD 68 |
| EX COL BIT 4 | CAD 69 | CAD 69 | CAD 69 | CAD 69 | CAD 69 | CAD 69 |
| EX COL BIT 5 | CAD 70 | CAD 70 | CAD 70 | CAD 70 | CAD 70 | CAD 70 |
| EX COL BIT 6 | CAD 71 | CAD 71 | CAD 71 | CAD 71 | CAD 71 | CAD 71 |
| EX COL BIT 7 | CAD 14 | CAD 14 | CAD 14 | CAD 14 | CAD 14 | CAD 14 |
| EX COL BIT 8 | CAD 67 | CAD 67 | CAD 67 | CAD 72 | CAD 72 | CAD 72 |
| EX COL BIT 9 | N/A | N/A | N/A | N/A | N/A | N/A |
| EX BANK SEL BIT 0 | CAD 66 | CAD 66 | CAD 66 | CAD 66 | CAD 66 | CAD 66 |
| EX BANK SEL BIT 1 | N/A | N/A | N/A | CAD 67 | CAD 67 | CAD 67 |
| EX BOARD SEL BIT 0 | CAD 72 | CAD 3 | CAD 3 | CAD 73 | CAD 3 | CAD 3 |
| EX BOARD SEL BIT 1 | CAD 73 | CAD 73 | CAD 4 | CAD 74 | CAD 74 | CAD 4 |
| EX BOARD SEL BIT 2 | CAD 74 | CAD 74 | CAD 74 | CAD 75 | CAD 75 | CAD 75 |
| EX BOARD SEL BIT 3 | CAD 75 | CAD 75 | CAD 75 | CAD 76 | CAD 76 | CAD 76 |
| EX BOARD SEL BIT 4 | CAD 76 | CAD 76 | CAD 76 | CAD 77 | CAD 77 | CAD 77 |
| EX BOARD SEL BIT 5 | CAD 77 | CAD 77 | CAD 77 | CAD 78 | CAD 78 | CAD 78 |
| EX BOARD SEL BIT 6 | CAD 78 | CAD 78 | CAD 78 | CAD 79 | CAD 79 | CAD 79 |
| EX BOARD SEL BIT 7 | CAD 79 | CAD 79 | CAD 79 | CAD 80 | CAD 80 | CAD 80 |
| EX BOARD SEL BIT 8 | CAD 80 | CAD 80 | CAD 80 | N/A | N/A | N/A |

TABLE 2

Addressing Matrix For Modules Using 4Mbit DRAMS

| LOGICAL SIGNAL | INTERLEAVE FACTOR WITH 2 BANKS | | | INTERLEAVE FACTOR WITH 4 BANKS | | |
|---|---|---|---|---|---|---|
| | 1-WAY | 2-WAY | 4-WAY | 1-WAY | 2-WAY | 4-WAY |
| ROW BIT 0 | CAD 5 | CAD 5 | CAD 5 | CAD 5 | CAD 5 | CAD 5 |
| ROW BIT 1 | CAD 6 | CAD 6 | CAD 6 | CAD 6 | CAD 6 | CAD 6 |
| ROW BIT 2 | CAD 7 | CAD 7 | CAD 7 | CAD 7 | CAD 7 | CAD 7 |
| ROW BIT 3 | CAD 8 | CAD 8 | CAD 8 | CAD 8 | CAD 8 | CAD 8 |
| ROW BIT 4 | CAD 9 | CAD 9 | CAD 9 | CAD 9 | CAD 9 | CAD 9 |
| ROW BIT 5 | CAD 10 | CAD 10 | CAD 10 | CAD 10 | CAD 10 | CAD 10 |
| ROW BIT 6 | CAD 11 | CAD 11 | CAD 11 | CAD 11 | CAD 11 | CAD 11 |
| ROW BIT 7 | CAD 12 | CAD 12 | CAD 12 | CAD 12 | CAD 12 | CAD 12 |
| ROW BIT 8 | CAD 13 | CAD 13 | CAD 13 | CAD 13 | CAD 13 | CAD 13 |
| ROW BIT 9 | CAD 14 | CAD 14 | CAD 14 | CAD 14 | CAD 14 | CAD 14 |
| RW COL BIT 0 | CAD 3 | CAD 24 | CAD 24 | CAD 3 | CAD 25 | CAD 25 |
| RW COL BIT 1 | CAD 4 | CAD 4 | CAD 25 | CAD 4 | CAD 4 | CAD 26 |
| RW COL BIT 2 | CAD 15 | CAD 15 | CAD 15 | CAD 15 | CAD 15 | CAD 15 |
| RW COL BIT 3 | CAD 18 | CAD 18 | CAD 18 | CAD 18 | CAD 18 | CAD 18 |
| RW COL BIT 4 | CAD 19 | CAD 19 | CAD 19 | CAD 19 | CAD 19 | CAD 19 |
| RW COL BIT 5 | CAD 20 | CAD 20 | CAD 20 | CAD 20 | CAD 20 | CAD 20 |

TABLE 2-continued

Addressing Matrix For Modules Using 4Mbit DRAMS

| LOGICAL SIGNAL | INTERLEAVE FACTOR WITH 2 BANKS | | | INTERLEAVE FACTOR WITH 4 BANKS | | |
|---|---|---|---|---|---|---|
| | 1-WAY | 2-WAY | 4-WAY | 1-WAY | 2-WAY | 4-WAY |
| RW COL BIT 6 | CAD 21 | CAD 21 | CAD 21 | CAD 21 | CAD 21 | CAD 21 |
| RW COL BIT 7 | CAD 22 | CAD 22 | CAD 22 | CAD 22 | CAD 22 | CAD 22 |
| RW COL BIT 8 | CAD 17 | CAD 17 | CAD 17 | CAD 24 | CAD 24 | CAD 24 |
| RW COL BIT 9 | CAD 23 | CAD 23 | CAD 23 | CAD 23 | CAD 23 | CAD 23 |
| RW BANK SEL BIT 0 | CAD 16 | CAD 16 | CAD 16 | CAD 16 | CAD 16 | CAD 16 |
| RW BANK SEL BIT 1 | N/A | N/A | N/A | CAD 17 | CAD 17 | CAD 17 |
| RW BOARD SEL BIT 0 | CAD 24 | CAD 3 | CAD 3 | CAD 25 | CAD 3 | CAD 3 |
| RW BOARD SEL BIT 1 | CAD 25 | CAD 25 | CAD 4 | CAD 26 | CAD 26 | CAD 4 |
| RW BOARD SEL BIT 2 | CAD 26 | CAD 26 | CAD 26 | CAD 27 | CAD 27 | CAD 27 |
| RW BOARD SEL BIT 3 | CAD 27 | CAD 27 | CAD 27 | CAD 28 | CAD 28 | CAD 28 |
| RW BOARD SEL BIT 4 | CAD 28 | CAD 28 | CAD 28 | CAD 29 | CAD 29, | CAD 29 |
| RW BOARD SEL BIT 5 | CAD 29 | CAD 29 | CAD 29 | CAD 30 | CAD 30 | CAD 30 |
| RW BOARD SEL BIT 6 | CAD 30 | CAD 30 | CAD 30 | N/A | N/A | N/A |
| RW BOARD SEL BIT 7 | N/A | N/A | N/A | N/A | N/A | N/A |
| RW BOARD SEL BIT 8 | N/A | N/A | N/A | N/A | N/A | N/A |
| EX COL BIT 0 | CAD 3 | CAD 74 | CAD 74 | CAD 3 | CAD 75 | CAD 75 |
| EX COL BIT 1 | CAD 4 | CAD 4 | CAD 75 | CAD 4 | CAD 4 | CAD 76 |
| EX COL BIT 2 | CAD 15 | CAD 15 | CAD 15 | CAD 15 | CAD 15 | CAD 15 |
| EX COL BIT 3 | CAD 68 | CAD 68 | CAD 68 | CAD 68 | CAD 68 | CAD 68 |
| EX COL BIT 4 | CAD 69 | CAD 69 | CAD 69 | CAD 69 | CAD 69 | CAD 69 |
| EX COL BIT 5 | CAD 70 | CAD 70 | CAD 70 | CAD 70 | CAD 70 | CAD 70 |
| EX COL BIT 6 | CAD 71 | CAD 71 | CAD 71 | CAD 71 | CAD 71 | CAD 71 |
| EX COL BIT 7 | CAD 72 | CAD 72 | CAD 72 | CAD 72 | CAD 72 | CAD 72 |
| EX COL BIT 8 | CAD 67 | CAD 67 | CAD 67 | CAD 74 | CAD 74 | CAD 74 |
| EX COL BIT 9 | CAD 73 | CAD 73 | CAD 73 | CAD 73 | CAD 73 | CAD 73 |
| EX BANK SEL BIT 0 | CAD 66 | CAD 66 | CAD 66 | CAD 66 | CAD 66 | CAD 66 |
| EX BANK SEL BIT 1 | N/A | N/A | N/A | CAD 67 | CAD 67 | CAD 67 |
| EX BOARD SEL BIT 0 | CAD 74 | CAD 3 | CAD 3 | CAD 75 | CAD 3 | CAD 3 |
| EX BOARD SEL BIT 1 | CAD 75 | CAD 75 | CAD 4 | CAD 76 | CAD 76 | CAD 4 |
| EX BOARD SEL BIT 2 | CAD 76 | CAD 76 | CAD 76 | CAD 77 | CAD 77 | CAD 77 |
| EX BOARD SEL BIT 3 | CAD 77 | CAD 77 | CAD 77 | CAD 78 | CAD 78 | CAD 78 |
| EX BOARD SEL BIT 4 | CAD 78 | CAD 78 | CAD 78 | CAD 79 | CAD 79 | CAD 79 |
| EX BOARD SEL BIT 5 | CAD 79 | CAD 79 | CAD 79 | CAD 80 | CAD 60 | CAD 80 |
| EX BOARD SEL BIT 6 | CAD 80 | CAD 80 | CAD 80 | N/A | N/A | N/A |
| EX BOARD SEL BIT 7 | N/A | N/A | N/A | N/A | N/A | N/A |
| EX BOARD SEL BIT 8 | N/A | N/A | N/A | N/A | N/A | N/A |

What is claimed is:

1. A method, comprising the steps of:

receiving from a processor a read command and an address together specifying a memory location to be read;

testing whether said read command is accompanied by an additional indication that said processor will be unable to accept data from said memory location for at least a predetermined time after the issuance of said read command by said processor;

storing an address value corresponding to said memory location into a history buffer and marking the stored value as a valid history buffer entry if said read command is not accompanied by said additional indication, and otherwise refraining from said storing and marking;

repeating the foregoing steps until there is at least one address value stored in said history buffer;

receiving another read command and an address together from said processor specifying another memory location to be read;

testing whether the address of said other memory location has a predetermined relationship with any one of the address values stored in valid entries in said history buffer, the existence of said predetermined relationship indicating that said other memory location sequentially follows the memory location corresponding to the stored address value for which said predetermined relationship exists;

if the address of said other memory location has said predetermined relationship with any of the address values stored in valid entries in said history buffer, asserting a stream detect signal, and otherwise refraining from asserting said stream detect signal;

upon the assertion of said stream detect signal, fetching from a memory the data stored at the memory location sequentially following said other memory location and storing the fetched data in a stream buffer; and fetching the data stored in said stream buffer and returning it to said processor upon the receipt of a subsequent processor read command specifying said sequentially following memory location.

2. A method according to claim 1, wherein said additional indication comprises an exchange command signifying that said processor must write back data to said memory before said processor will be able to accept the data from said memory location, and wherein said predetermined time is the time required for said processor to perform the write back.

3. A method according to claim 1, wherein the address values stored in said history buffer each result from incrementing a corresponding address accompanying the corresponding read command from said processor, and wherein said step of testing for a predetermined relationship comprises the step of comparing the address of said other memory location with the address values stored in the valid entries in said history buffer to determine whether any of them match.

* * * * *